(12) United States Patent
Misaka

(10) Patent No.: US 6,788,464 B2
(45) Date of Patent: Sep. 7, 2004

(54) ZOOM LENS AND OPTICAL APPARATUS USING THE SAME

(75) Inventor: Makoto Misaka, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/966,698

(22) Filed: Sep. 26, 2001

(65) Prior Publication Data
US 2002/0131173 A1 Sep. 19, 2002

(30) Foreign Application Priority Data
Sep. 26, 2000 (JP) .......................... 2000/292910

(51) Int. Cl.⁷ .................. G02B 27/64; G02B 15/14
(52) U.S. Cl. .................. 359/557; 359/554; 359/676
(58) Field of Search .................. 359/554–557, 359/676–680; 396/52–55; 348/208

(56) References Cited

U.S. PATENT DOCUMENTS

| | | | | |
|---|---|---|---|---|
| 4,437,732 A | | 3/1984 | Ishiyama | 359/676 |
| 4,498,741 A | | 2/1985 | Ishiyama | 359/676 |
| 5,000,549 A | * | 3/1991 | Yamazaki | 359/557 |
| 5,270,857 A | | 12/1993 | Oizumi et al. | 359/554 |
| 5,731,897 A | * | 3/1998 | Suzuki | 359/557 |
| 5,751,485 A | * | 5/1998 | Suzuki | 359/557 |
| 5,831,768 A | * | 11/1998 | Ohtake | 359/557 |
| 5,946,145 A | * | 8/1999 | Ohtake | 359/791 |
| 5,956,184 A | | 9/1999 | Sato | 359/683 |
| 6,008,952 A | * | 12/1999 | Yamamoto | 359/683 |
| 6,010,537 A | * | 1/2000 | Konno et al. | 359/389 |
| 6,025,962 A | * | 2/2000 | Suzuki | 359/766 |
| 6,061,180 A | | 5/2000 | Hayakawa | 359/557 |
| 6,124,972 A | | 9/2000 | Hayakawa et al. | 359/557 |
| 6,285,501 B1 | * | 9/2001 | Suzuki | 359/554 |

FOREIGN PATENT DOCUMENTS

| | | |
|---|---|---|
| JP | 61-51291 | 9/1982 |
| JP | 63-266415 | 11/1988 |
| JP | 10-90601 | 4/1998 |
| JP | 10-133109 | 5/1998 |
| JP | 10-282413 | 10/1998 |
| JP | 11-231220 | 8/1999 |

OTHER PUBLICATIONS

English Abstract of JP 10–90601.
English Abstract of JP 10–282413.
English Abstract of JP 10–133109.
English Abstract of JP 61–51291.
English Abstract of JP 11–231220.
English Abstract of JPE 63–266415.

* cited by examiner

*Primary Examiner*—Thong Q. Nguyen
(74) *Attorney, Agent, or Firm*—Morgan & Finnegan, L.L.P.

(57) ABSTRACT

A zoom lens includes, in order from an object side, a first lens unit of positive refractive power, a second lens unit of negative refractive power, a third lens unit of positive refractive power, a fourth lens unit of negative refractive power, and a fifth lens unit of positive refractive power, wherein, the zoom lens moves one or more of the lens units during zooming from a wide-angle end to a telephoto end so that a separation between the first lens unit and the second lens unit increases, a separation between the second lens unit and the third lens unit decreases, a separation between the third lens unit and the fourth lens unit increases, and a separation between the fourth lens unit and the fifth lens unit decreases, and wherein an image is displaced by moving at least part lens unit of the fourth lens unit so as to have a component of a direction perpendicular to an optical axis.

8 Claims, 29 Drawing Sheets

ZOOM LENS AND OPTICAL APPARATUS USING THE SAME

BACKGROUND OF THE INVENTION

The present invention relates to a zoom lens and optical apparatus using the same. In particular, the present invention is suitable for photograph cameras, video cameras, electronic still cameras, digital cameras, 3-CCD compatible electronic cameras and the like which attempt to obtain still images and stabilize shot images by displacing images by moving part of lens units that constitute the zoom lens so as to have a component of a direction perpendicular to an optical axis, and by optically correcting blurs in shot images when the zoom lens vibrates (or inclines).

A so-called five-unit zoom lens including five lens units having, in order from the object side, positive, negative, positive, negative and positive refractive powers has conventionally been known as a zoom type suitable for a single-lens reflex camera.

This zoom type is suitable for a zoom lens of a high magnification range since each lens unit moves a relatively small distance, and advantageous in making wide-angle a short focus side since it may easily keep a long back focus.

This type of zoom lens is disclosed in U.S. Pat. Nos. 4,437,732, 4,498,741, Japanese Patent Publications No. Sho 61-51291 and the like. This assignee also discloses similar zoom lenses in Japanese Laid-Open Patent Applications Nos. Hei 6-230285, Hei 8-179213, Hei 9-304697 and the like.

On the other hand, a shooting system blurs images when receiving occasional vibrations. Various zoom lenses each including a mechanism for compensating for blurred images caused by the occasional vibrations (i.e., a vibration-resistant mechanism) have conventionally been proposed. For example, U.S. Pat. Nos. 5,270857, 6,124,972 and the like propose means for moving part of lens units which constitute an optical system (of the zoom lens) in a direction approximately perpendicular to the optical axis so as to compensating for vibration caused blurred images.

U.S. Pat. No. 5,270,857 discloses a zoom lens in its embodiment that is suitable primarily for a taking lens for use with a lens shutter camera, and teaches a structure that compensates for blurred images by moving in a direction approximately perpendicular to the optical axis partial lens unit part of a three-unit zoom lens that includes, in order from an object side, a first lens unit of negative refractive power, a second lens unit of positive refractive power, and a third lens unit of negative refractive power.

U.S. Pat. No. 6,124,972 discloses a zoom lens in its embodiment that is suitable primarily for a standard zoom lens for use with a single-lens reflex camera, and teaches a structure that compensates for blurred images by moving in a direction approximately perpendicular to the optical axis a second lens unit in a four-unit zoom lens that includes, in order from an object side, a first lens unit of positive refractive power, the second lens unit of negative refractive power, a third lens unit of positive refractive power, and a fourth lens unit of negative refractive power.

In general, a mechanism for vibrating part of lens unit in a shooting system so as to eliminate blurs in a shot image and obtaining still images requires a larger image-blur correcting capability, to smaller shift and rotary amounts of lens unit(s) (or movable lens unit(s)) to be vibrated for blur correction, a wholly compact apparatus, and the like.

In addition, if the defocus of the movable lens unit causes much eccentric aberration, the eccentric aberration defocuses images after blurs are corrected.

Therefore, an optical system having the vibration resistant function requires a smaller amount of eccentric aberration generated when the movable lens is moved in a direction orthogonal to the optical axis and made in an eccentric state, a larger blur-image correction capability with a smaller shift amount of the movable lens unit, a large so-called eccentric sensitivity (that is a ratio $\Delta X/\Delta H$ of a correction amount $\Delta X$ to blurred images to a unit shift amount $\Delta H$), and the like.

The zoom lens disclosed in U.S. Pat. No. 5,270,857 is a zoom lens that is suitable primarily for a zoom lens for use with a lens shutter camera and equipped with a mechanism for compensating for vibrations. In attempting to apply the zoom lens structure disclosed herein to a single-lens reflex camera, the back focus to keep a drive space for a QR mirror (quick return mirror) often runs short.

The zoom lens disclosed in U.S. Pat. No. 6,124,972 is a standard zoom lens for a single-lens reflex camera and equipped with a mechanism for compensating for vibrations, but such a four-unit structure of the lens unit makes it difficult to realize high range zooming.

SUMMARY OF THE INVENTION

It is an exemplified object of the present invention to provide a zoom lens and optical apparatus using the same which have high range zooming and maintains good stability of optical performance throughout the zoom range, facilitating a compact size of the entire apparatus even when equipped with a (vibration resistant) mechanism for compensating for vibrations, and has a vibration resistant function which may provide good images during compensation for vibrations.

In order to achieve the above object, a zoom lens of one aspect of the present invention comprises, in order from an object side, a first lens unit of positive refractive power, a second lens unit of negative refractive power, a third lens unit of positive refractive power, a fourth lens unit of negative refractive power, and a fifth lens unit of positive refractive power, wherein the zoom lens moves part of the lens units during zooming from a wide-angle end to a telephoto end so that a separation between the first lens unit and the second lens unit increases, a separation between the second lens unit and the third lens unit decreases, a separation between the third lens unit and the fourth lens unit increases, and a separation between the fourth lens unit and the fifth lens unit decreases, and wherein an image is displaced by moving at least part of the fourth lens unit so as to have a component of a direction perpendicular to an optical axis. According to the zoom lens, third lens constricts a luminous flux incident to the fourth lens unit. Therefore, it is relatively easy to miniaturize the fourth lens unit. In this zoom type, the fourth lens unit assists the zoom range in becoming enough large and serves to properly correct fluctuations in various aberrations during zooming, thus providing relatively small zooming contributions. Therefore, the present invention is characterized in that it is easy to properly control a remaining aberration amount in this lens unit. Due to this characteristic, the fourth lens unit may appropriately correct various eccentric aberrations during defocusing. Thereby, the zoom lens of the present invention may make small the entire apparatus to which such a zoom lens is applied, and maintain good stability of optical performance during compensation for vibrations.

In the above zoom lens, the fourth lens unit comprises two or more lens components including a lens component of negative refractive power, and the image is displaced by moving the lens component of negative refractive power so as to have the component of the direction perpendicular to the optical axis. According to this zoom lens, the lens component of negative refractive power may be set independent of a refractive power suitable for the compensation for vibrations by setting the refractive power of the entire fourth lens unit to be suitable for the zoom lens, and by assigning the lens component of negative refractive power to an image displacement correction unit.

In the above zoom lens, the fourth lens unit includes a lens component of positive refractive power and a lens component of negative refractive power. According to this zoom lens, the lens component of positive refractive power may easily make strong the lens component of negative refractive power as an image displacement correction unit, thereby making small the defocus amount during compensation for vibrations, and rendering compact the entire apparatus.

In the above zoom lens, a condition $0.01 < \text{fis}/\text{f4} < 0.8$ is satisfied where fis is a focal length of the lens component of negative refractive power so as to have the component of the direction perpendicular to the optical axis, and f4 is a focal length of the fourth lens unit. This zoom lens may properly set a ratio of the focal length of the lens component of negative refractive power that is moved so as to have a component of the direction perpendicular to the optical axis, to that of the fourth lens unit. Under this condition, when this ratio exceeds the upper limit, the defocus amount becomes too large during compensation for vibrations. When this ratio exceeds the lower limit, on the other hand, it becomes difficult to correct various aberrations, in particular, the coma aberration at a telephoto end during compensation for vibrations.

In the above zoom lens, the fourth lens unit includes, in order from the object side, a lens component of positive refractive power, and a lens component of negative refractive power that displaces an image by moving the lens component of negative refractive power so as to have the component of the direction perpendicular to the optical axis. According to this zoom lens, the luminous-flux constricting power by the lens component of positive refractive power makes small a diameter of the luminous flux incident to the lens unit of negative refractive power, consequently enabling to make small the image displacement correction unit.

In the above zoom lens, a condition $-0.8 < \beta\text{rt} < -0.1$ is satisfied where βrt is a lateral magnification at a telephoto end of an optical member disposed closer to the image plane side than the lens component of negative refractive power that is moved so as to have the component of the direction approximately perpendicular to the axial. According to this zoom lens, when the lateral magnification exceeds the upper limit, the absolute value of the image displacement sensitivity in the image displacement correction unit tends to become small. As a result, the defocus amount becomes large during compensation for vibrations, and the size of the entire apparatus becomes large. Conversely, when the lateral magnification exceeds the lower limit, the absolute value of the image displacement sensitivity in the image displacement correction unit tends to large, but the displacement of the image displacement correction unit requires the high precise control mechanism and the entire apparatus becomes disadvantageously large.

In the above zoom lens, the lens component of positive refractive power comprises a cemented lens of a positive lens and a negative lens or a single positive lens, and the lens component of negative refractive power comprises a cemented lens of a positive lens and a negative lens.

Further, according to another aspect of the present invention, an optical apparatus comprising the above zoom lens. Since this optical apparatus includes the above zoom lens and achieves the same operation, the optical apparatus may have a compact body and good stability of optical performance.

Other objects and further features of the present invention will become readily apparent from the following description of preferred embodiments with reference to accompanying drawings.

DETAILED DESCRIPTION OF THE PREFERRED EMBODIMENTS

A description will now be given of the zoom lenses the embodiments of the present invention with reference to drawings.

Figure 1:
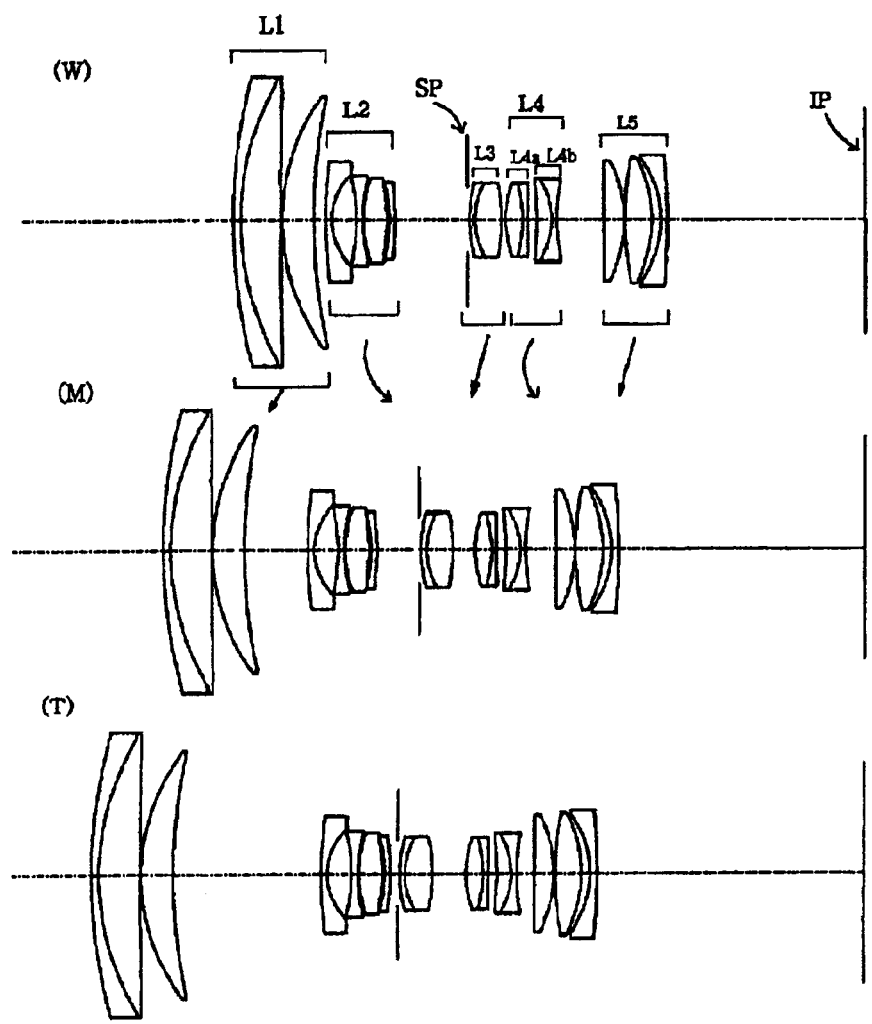
FIG. 1 is a sectional view of a zoom lens of numerical example 1 among embodiments of the present invention.
Figure 2:
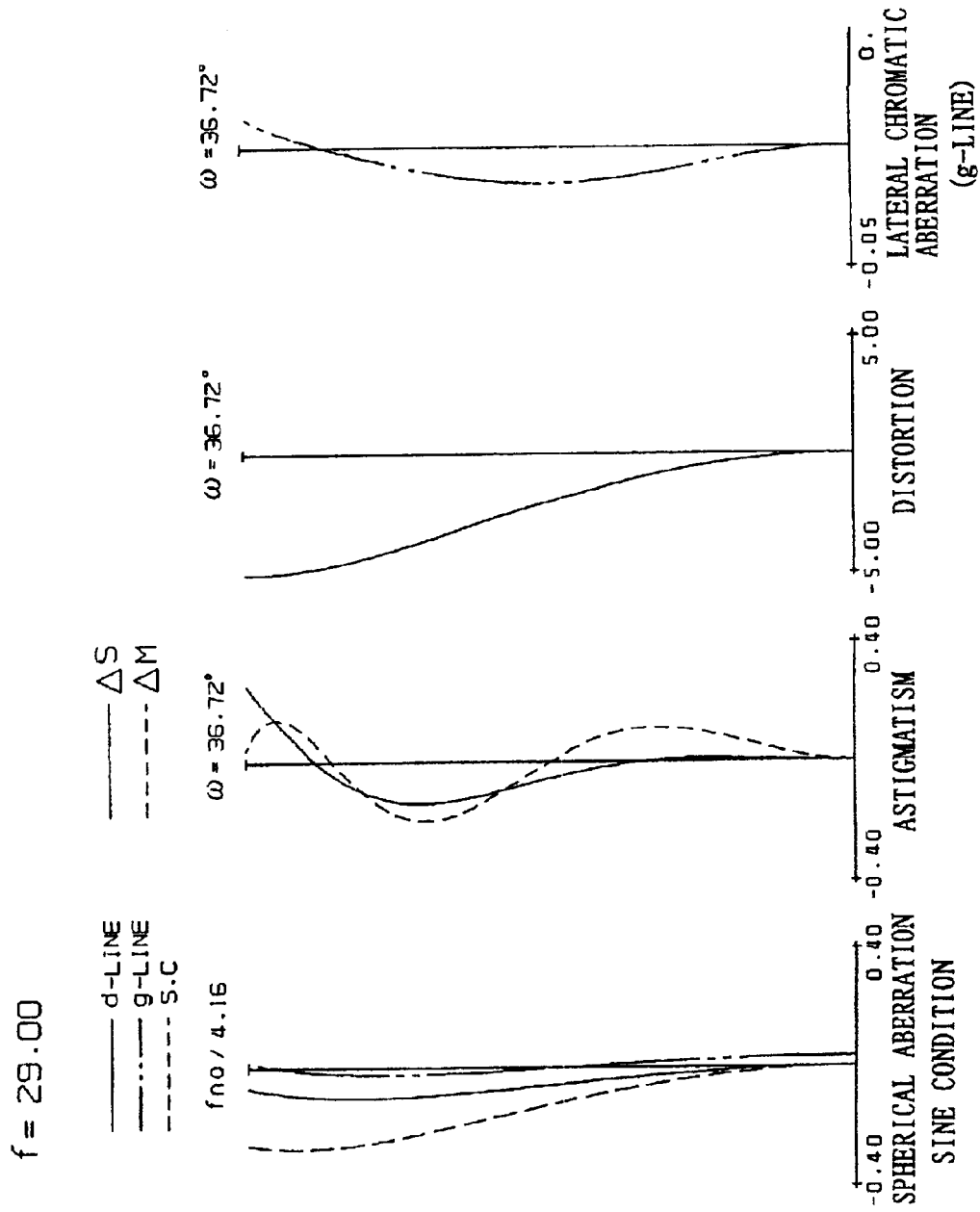
FIG. 2 shows graphic representations of longitudinal aberrations at a wide-angle end of a reference state in the zoom lens of the numerical example 1 among the instant embodiments.
Figure 3:
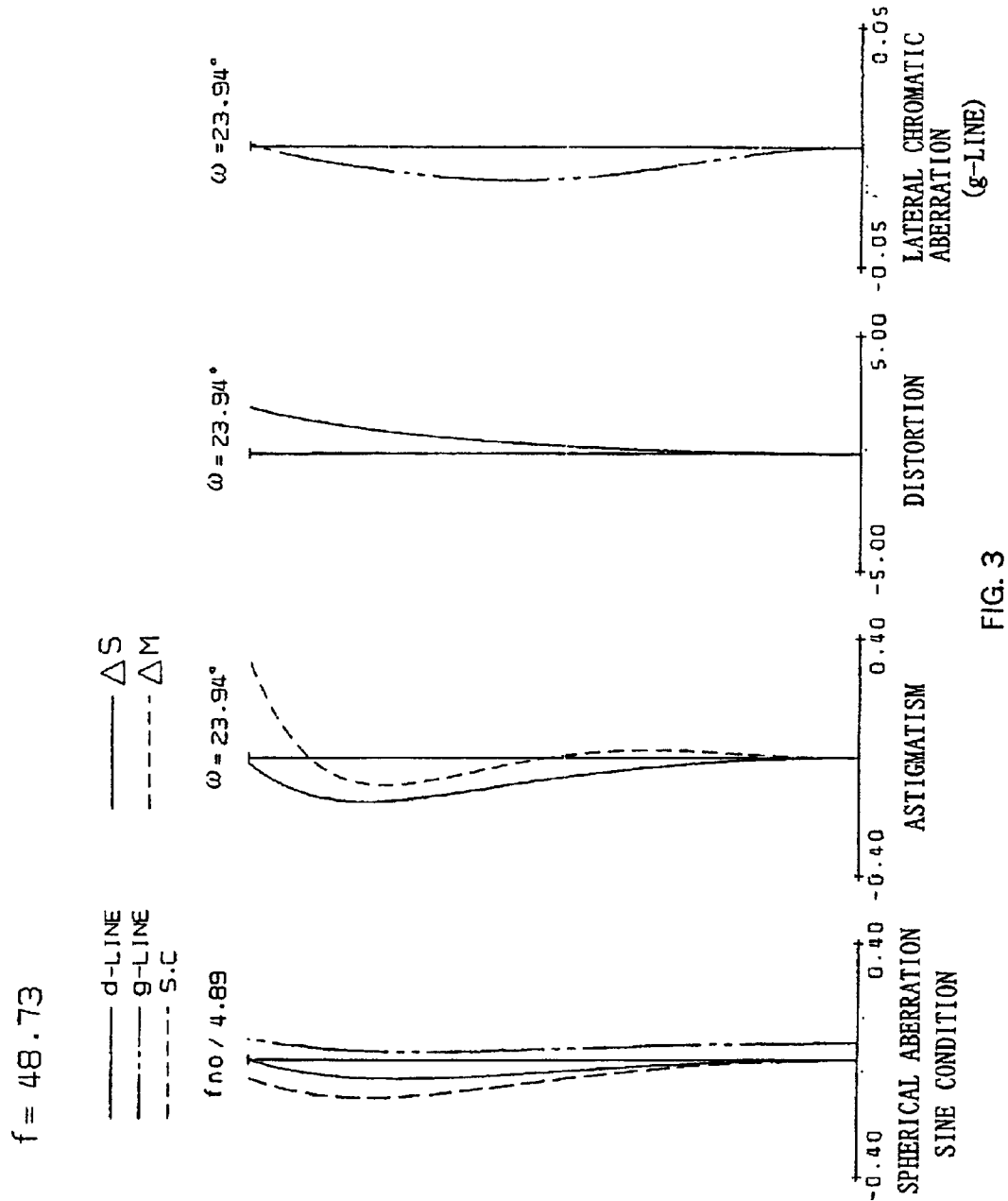
FIG. 3 shows graphic representations of longitudinal aberrations at a middle focal length of a reference state in the zoom lens of the numerical example 1 among the instant embodiments.
Figure 4:
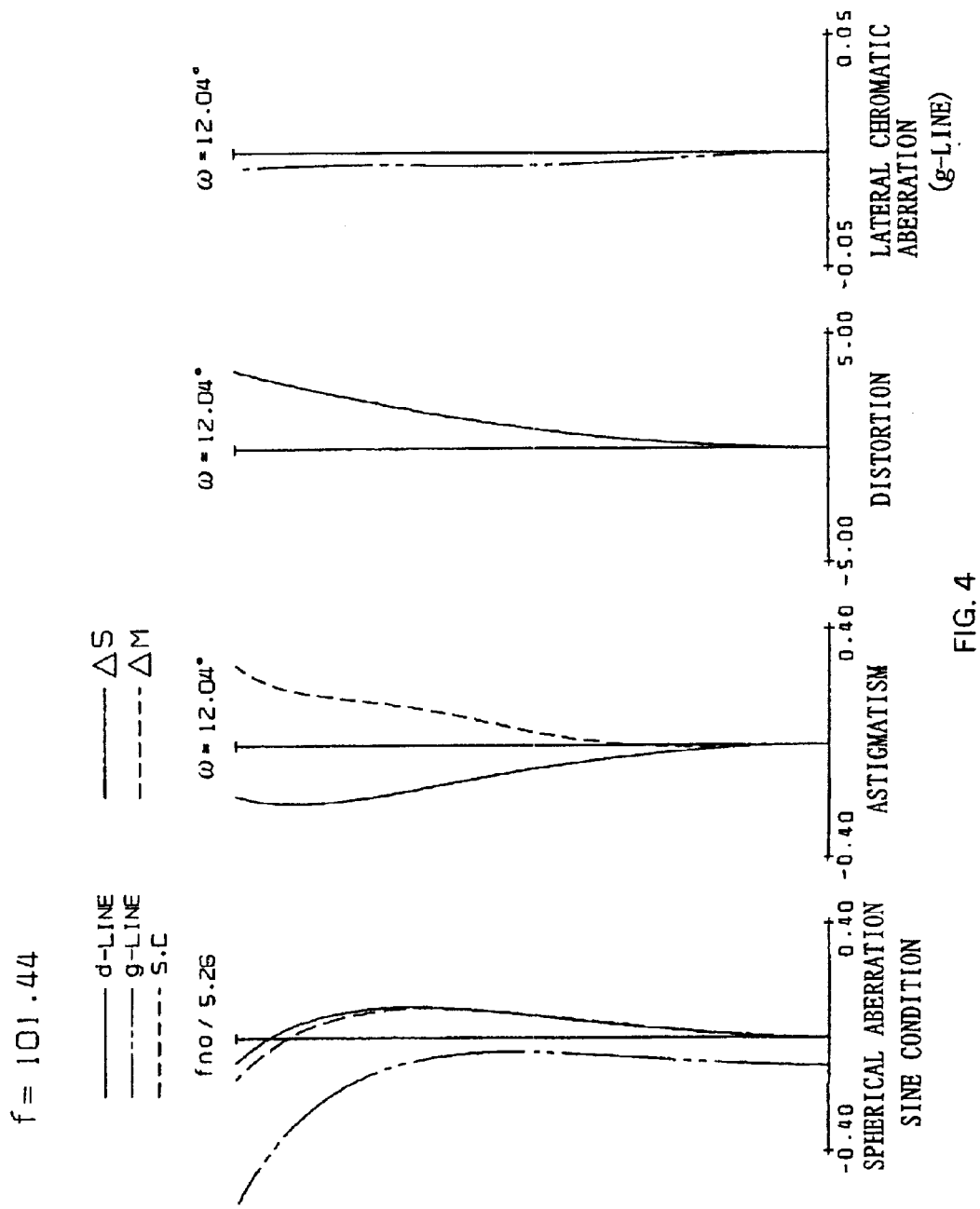
FIG. 4 shows graphic representations of longitudinal aberrations at a telephoto end of a reference state in the zoom lens of the numerical example 1 among the instant embodiments.
Figure 5:
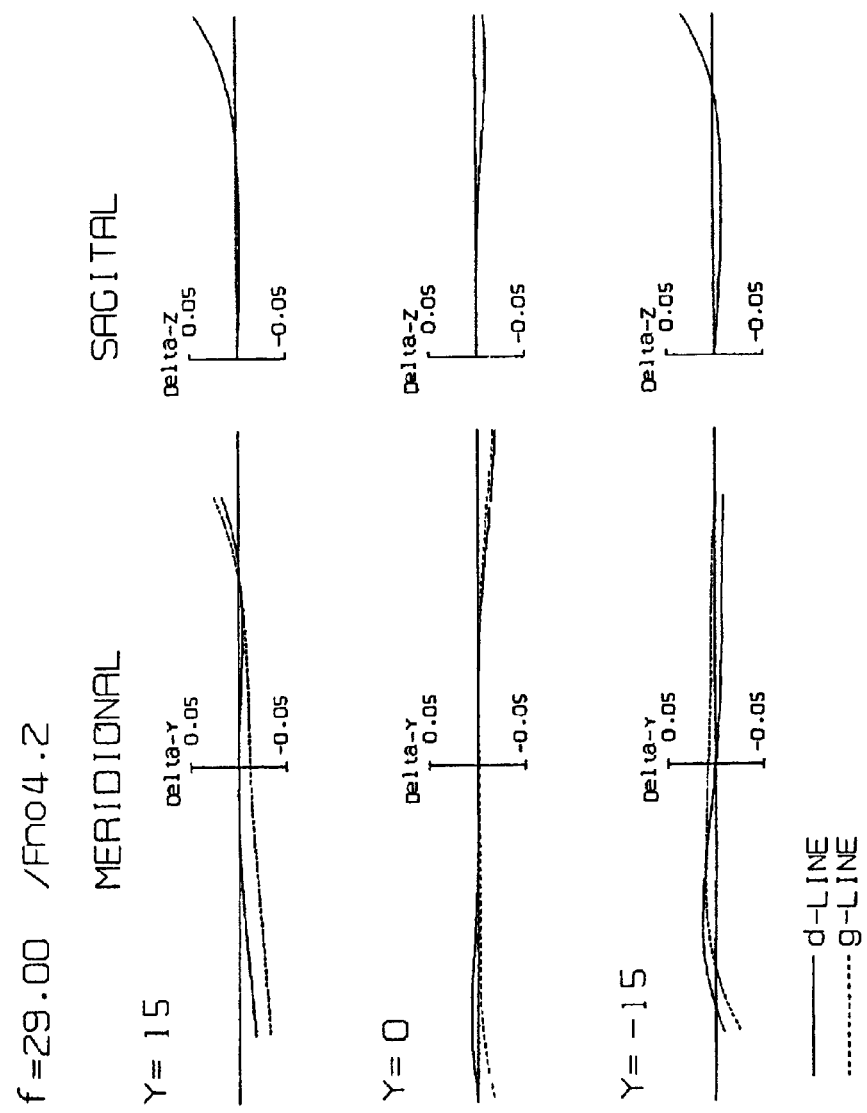
FIG. 5 shows graphic representations of lateral aberrations at a wide-angle end when the zoom lens of the numerical example 1 among the instant embodiments corrects blurred images at an infinite distant object corresponding to an angle of view of 0.3°.
Figure 6:
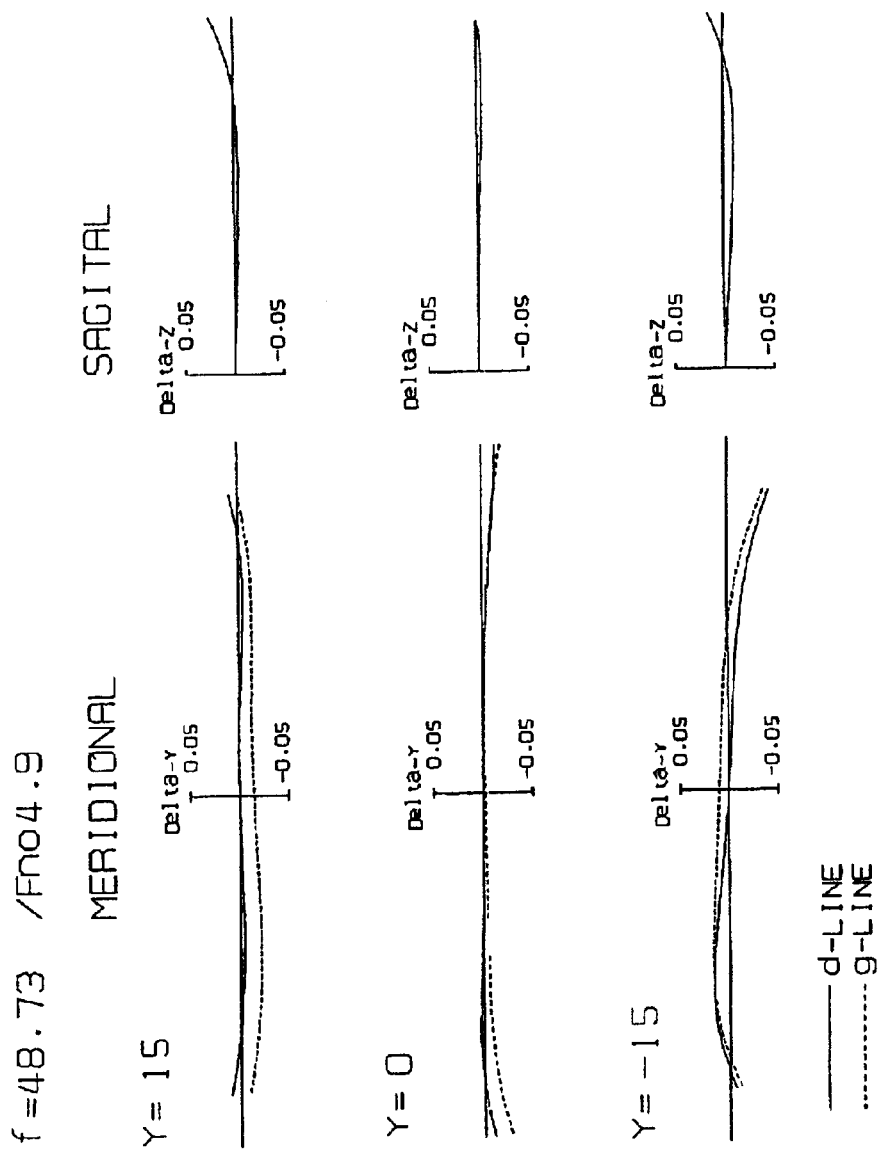
FIG. 6 shows graphic representations of lateral aberrations at a middle focal length when the zoom lens of the numerical example 1 among the instant embodiments corrects blurred images at an infinite distant object corresponding to an angle of view of 0.3°.
Figure 7:
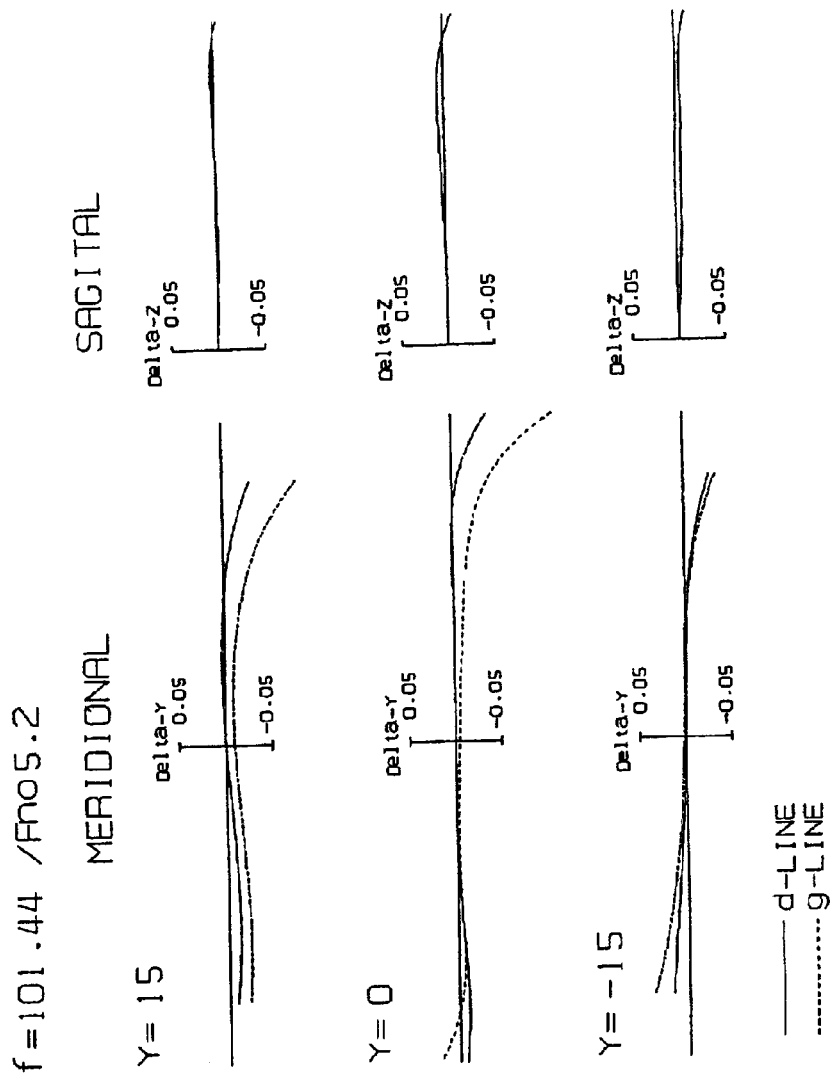
FIG. 7 shows graphic representations of lateral aberrations at a telephoto end when the zoom lens of the numerical example 1 among the instant embodiments corrects blurred images at an infinite distant object corresponding to an angle of view of 0.3°.

FIG. 1 is a sectional view of a zoom lens of numerical example 1 among embodiments of the present invention. FIG. 2 shows graphic representations of longitudinal aberrations at a wide-angle end of a reference state in the zoom lens of the numerical example 1 among the instant embodiments. FIG. 3 shows graphic representations of longitudinal aberrations at a middle focal length of a reference state in the zoom lens of the numerical example 1 among the instant embodiments. FIG. 4 shows graphic representations of longitudinal aberrations at a telephoto end of a reference state in the zoom lens of the numerical example 1 among the instant embodiments. FIG. 5 shows graphic representations of lateral aberrations at a wide-angle end when the zoom lens of the numerical example 1 among the instant embodiments corrects blurred images at an infinite distant object corresponding to an angle of view of 0.3°. FIG. 6 shows graphic representations of lateral aberrations at a middle focal length when the zoom lens of the numerical example 1 among the instant embodiments corrects blurred images at an infinite distant object corresponding to an angle of view of 0.3°. FIG. 7 shows graphic representations of lateral aberrations at a telephoto end when the zoom lens of the numerical example 1 among the instant embodiments corrects blurred images at an infinite distant object corresponding to an angle of view of 0.3°.

Figure 8:
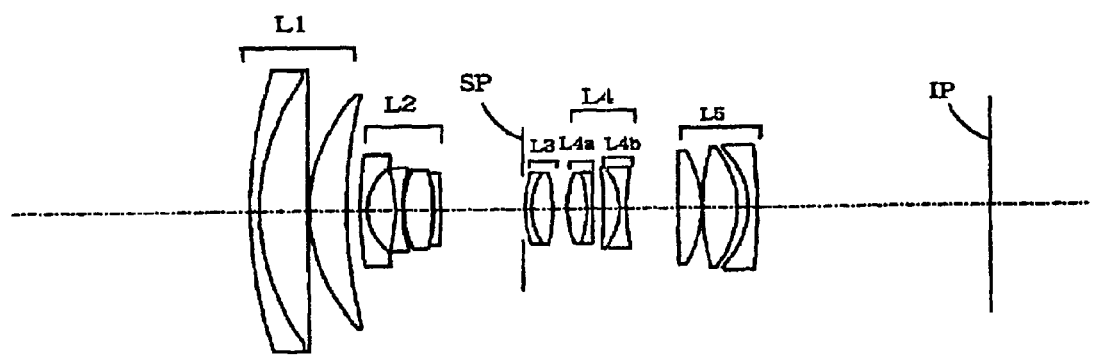
FIG. 8 is a sectional view of a zoom lens of numerical example 2 among embodiments of the present invention.
Figure 9:
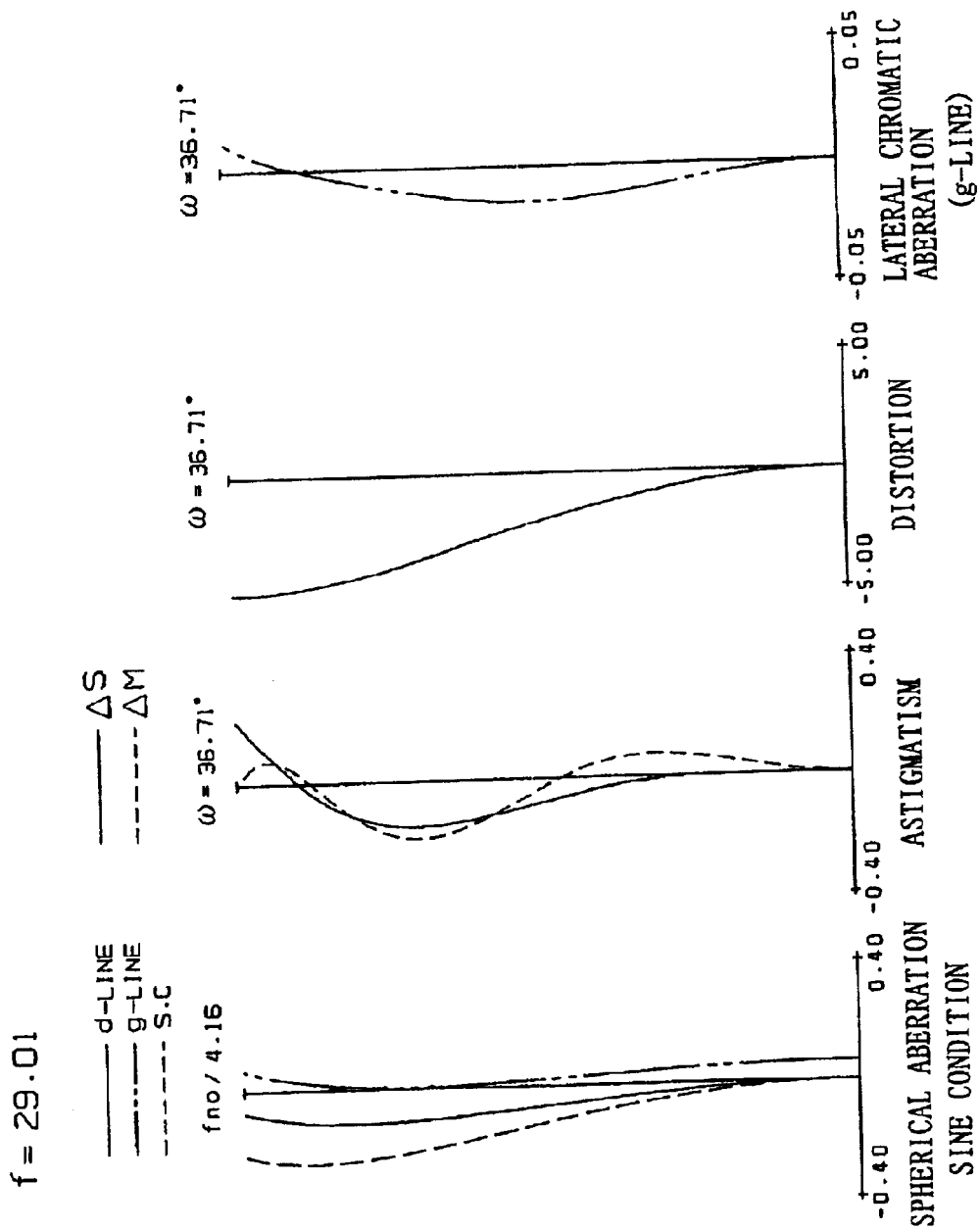
FIG. 9 shows graphic representations of longitudinal aberrations at a wide-angle end of a reference state in the zoom lens of the numerical example 2 among the instant embodiments.
Figure 10:
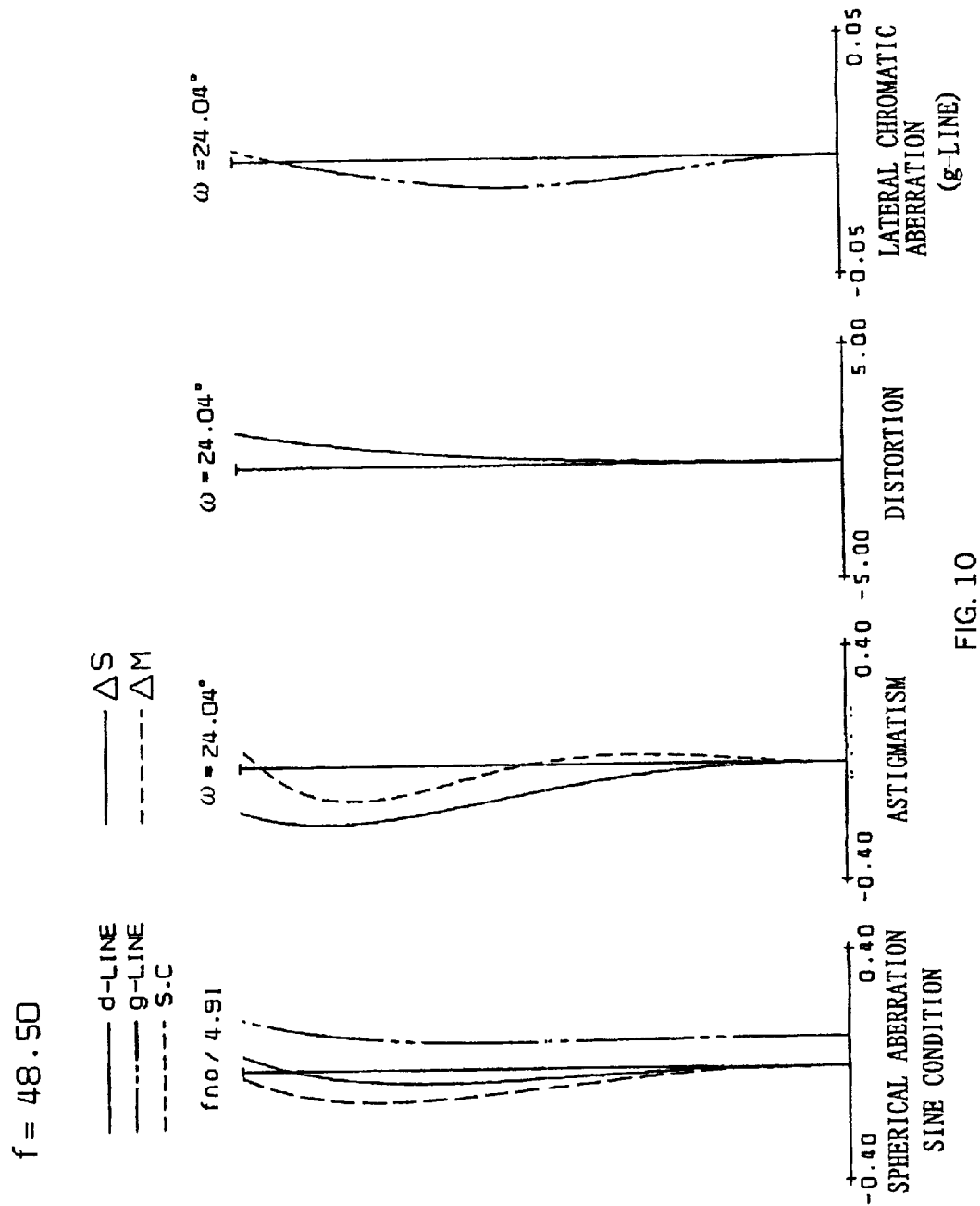
FIG. 10 shows graphic representations of longitudinal aberrations at a middle focal length of a reference state in the zoom lens of the numerical example 2 among the instant embodiments.
Figure 11:
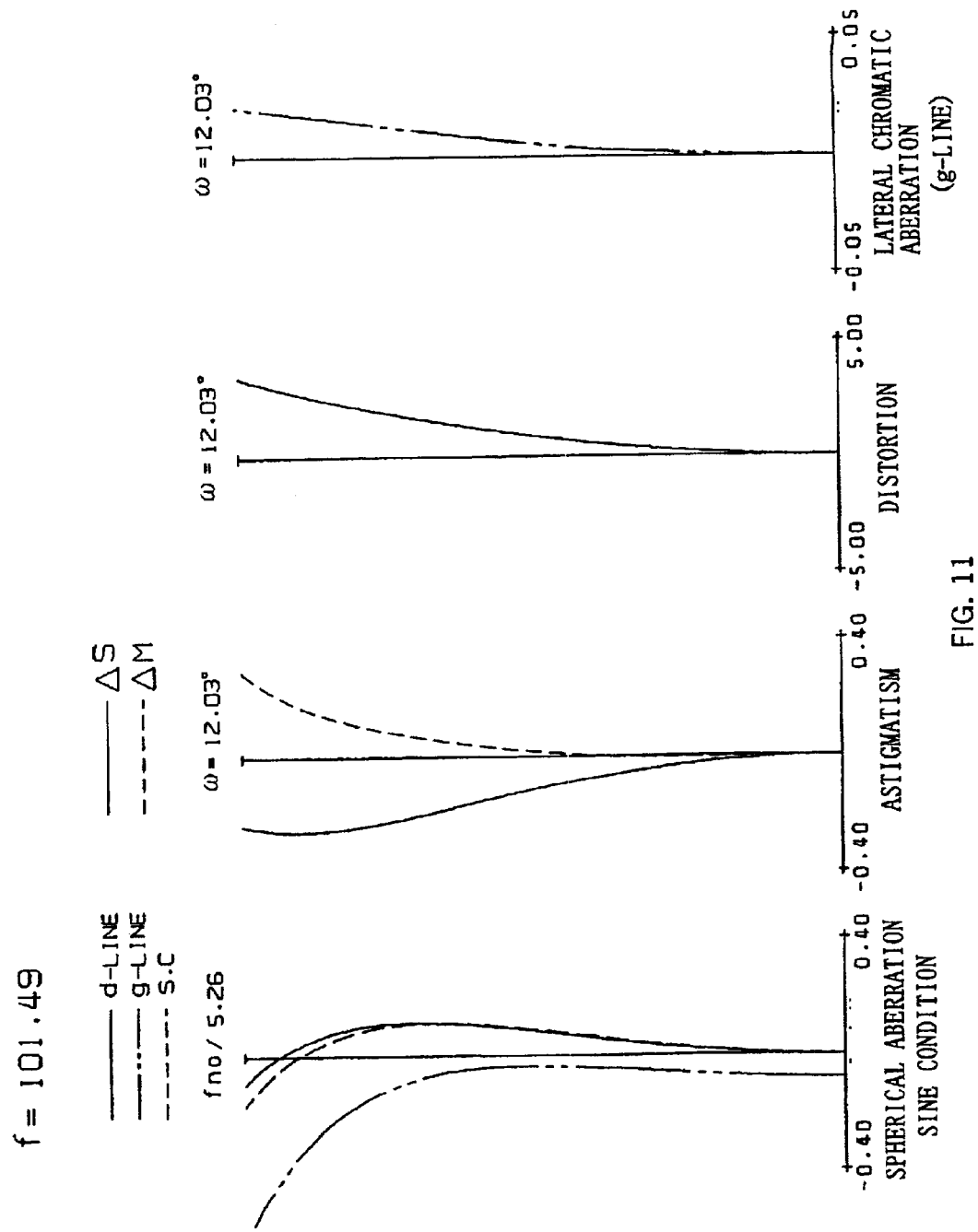
FIG. 11 shows graphic representations of longitudinal aberrations at a telephoto end of a reference state in the zoom lens of the numerical example 2 among the instant embodiments.
Figure 12:
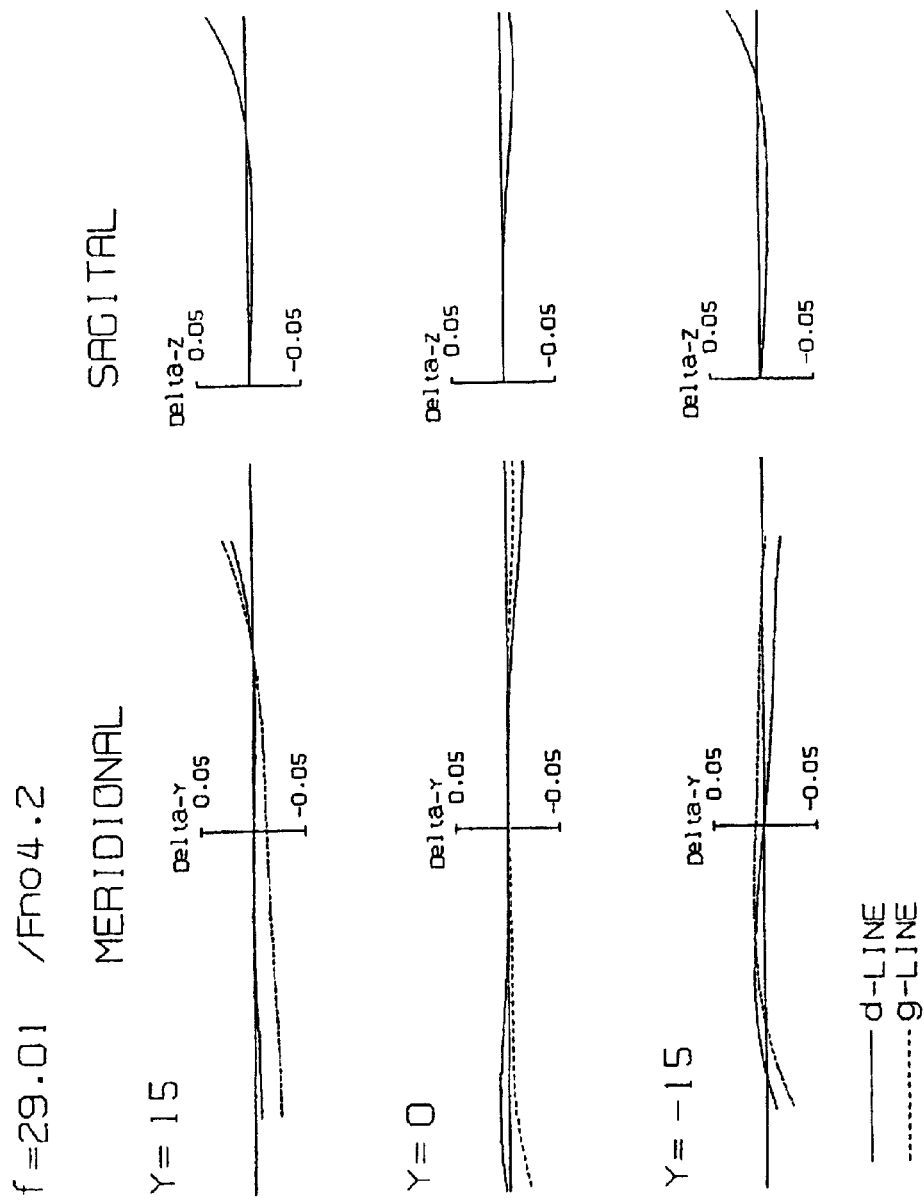
FIG. 12 shows graphic representations of lateral aberrations at a wide-angle end when the zoom lens of the numerical example 2 among the instant embodiments corrects blurred images at an infinite distant object corresponding to an angle of view of 0.3°.
Figure 13:
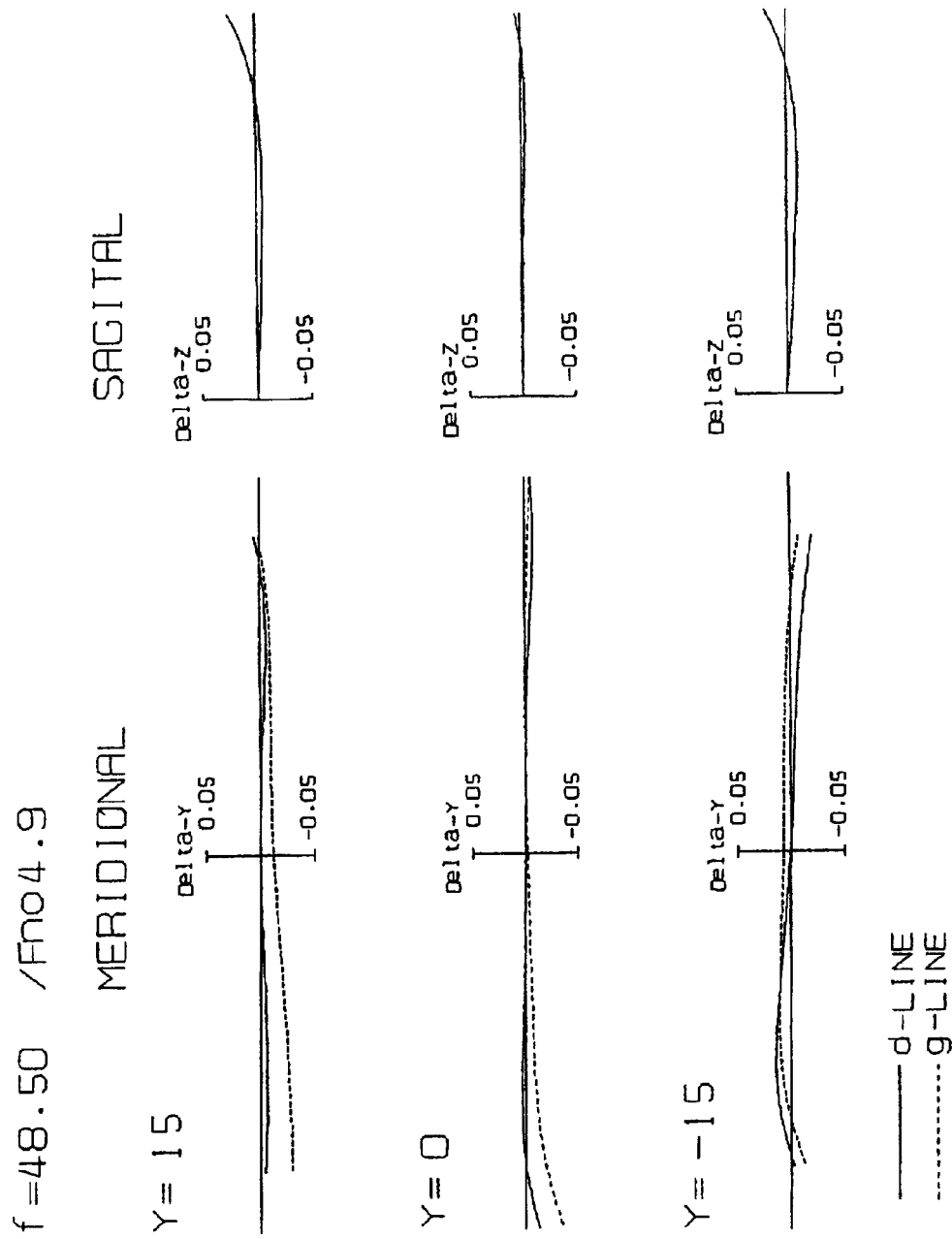
FIG. 13 shows graphic representations of lateral aberrations at a middle focal length when the zoom lens of the numerical example 2 among the instant embodiments corrects blurred images at an infinite distant object corresponding to an angle of view of 0.3°.
Figure 14:
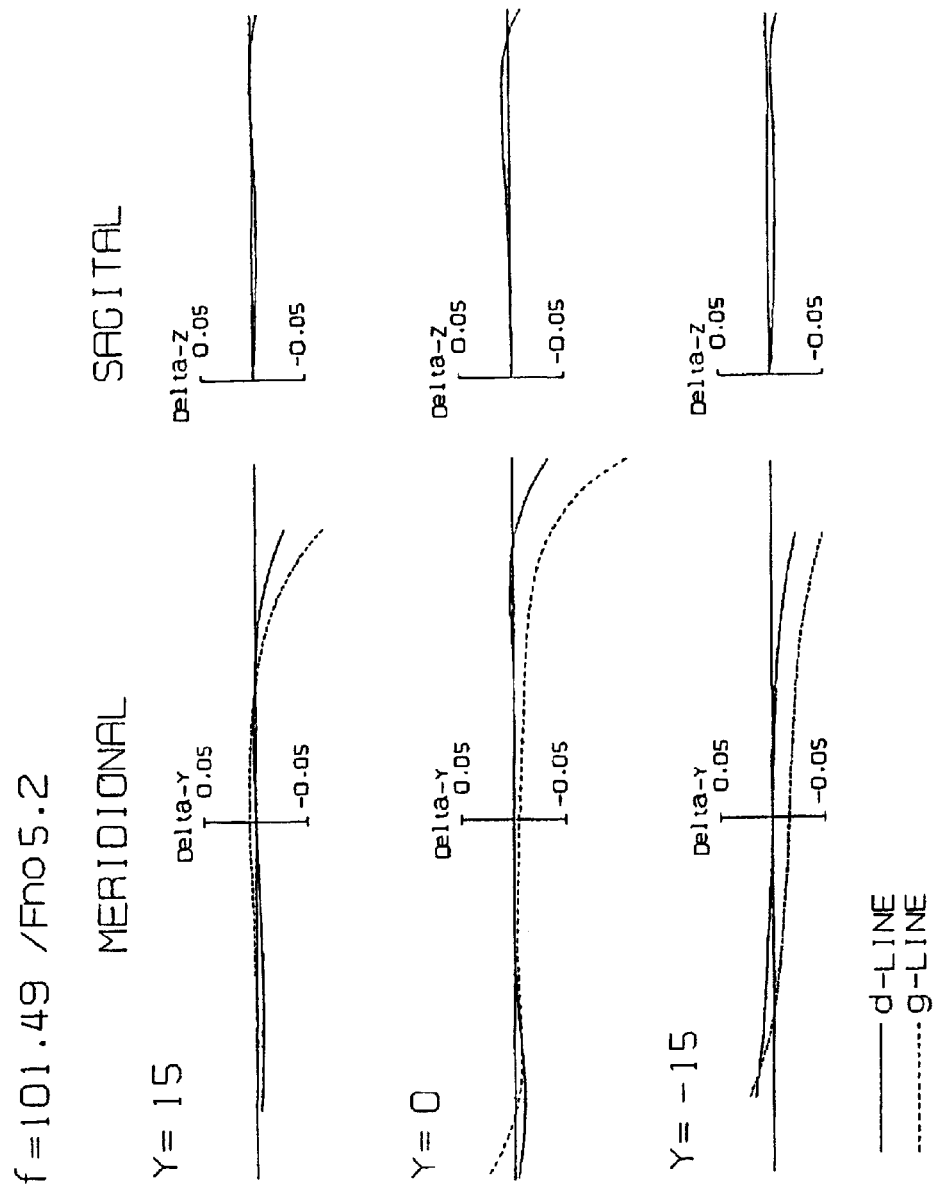
FIG. 14 shows graphic representations of lateral aberrations at a telephoto end when the zoom lens of the numerical example 2 among the instant embodiments corrects blurred images at an infinite distant object corresponding to an angle of view of 0.3°.

FIG. 8 is a sectional view of a zoom lens of numerical example 2 among embodiments of the present invention. FIG. 9 shows graphic representations of longitudinal aberrations at a wide-angle end of a reference state in the zoom lens of the numerical example 2 among the instant embodiments. FIG. 10 shows graphic representations of longitudinal aberrations at a middle focal length of a reference state in the zoom lens of the numerical example 2 among the instant embodiments. FIG. 11 shows graphic representations of longitudinal aberrations at a telephoto end of a reference state in the zoom lens of the numerical example 2 among the instant embodiments. FIG. 12 shows graphic representations of lateral aberrations at a wide-angle end when the zoom lens of the numerical example 2 among the instant embodiments corrects blurred images at an infinite distant object corresponding to an angle of view of 0.3°. FIG. 13 shows graphic representations of lateral aberrations at a middle focal length when the zoom lens of the numerical example 2 among the instant embodiments corrects blurred images at an infinite distant object corresponding to an angle of view of 0.3°. FIG. 14 shows graphic representations of lateral aberrations at a telephoto end when the zoom lens of the numerical example 2 among the instant embodiments corrects blurred images at an infinite distant object corresponding to an angle of view of 0.3°.

Figure 15:
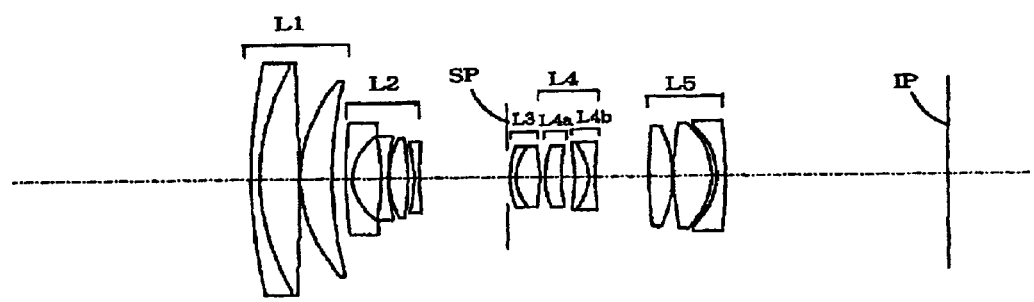
FIG. 15 is a sectional view of a zoom lens of numerical example 3 among embodiments of the present invention.
Figure 16:
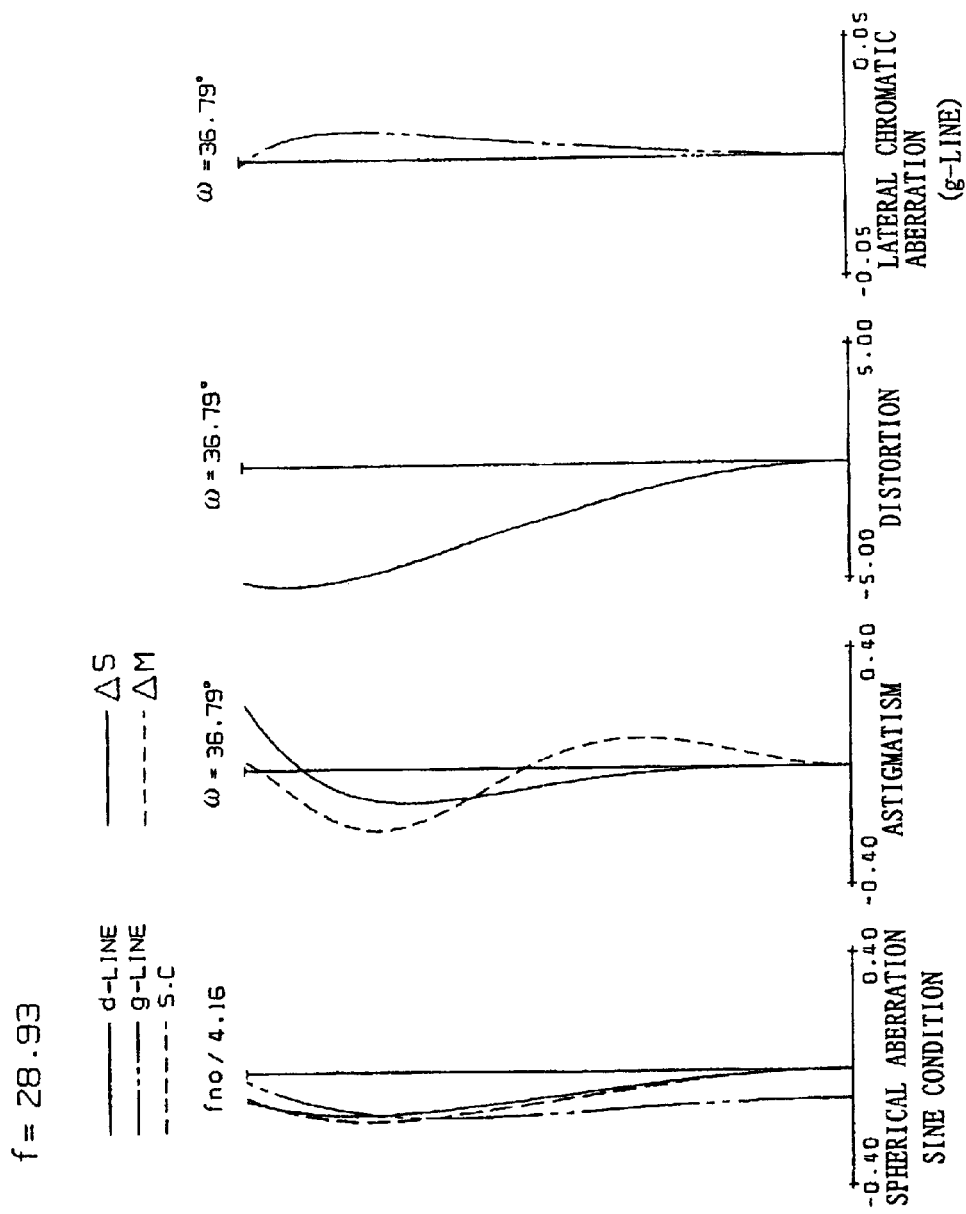
FIG. 16 shows graphic representations of longitudinal aberrations at a wide-angle end of a reference state in the zoom lens of the numerical example 3 among the instant embodiments.
Figure 17:
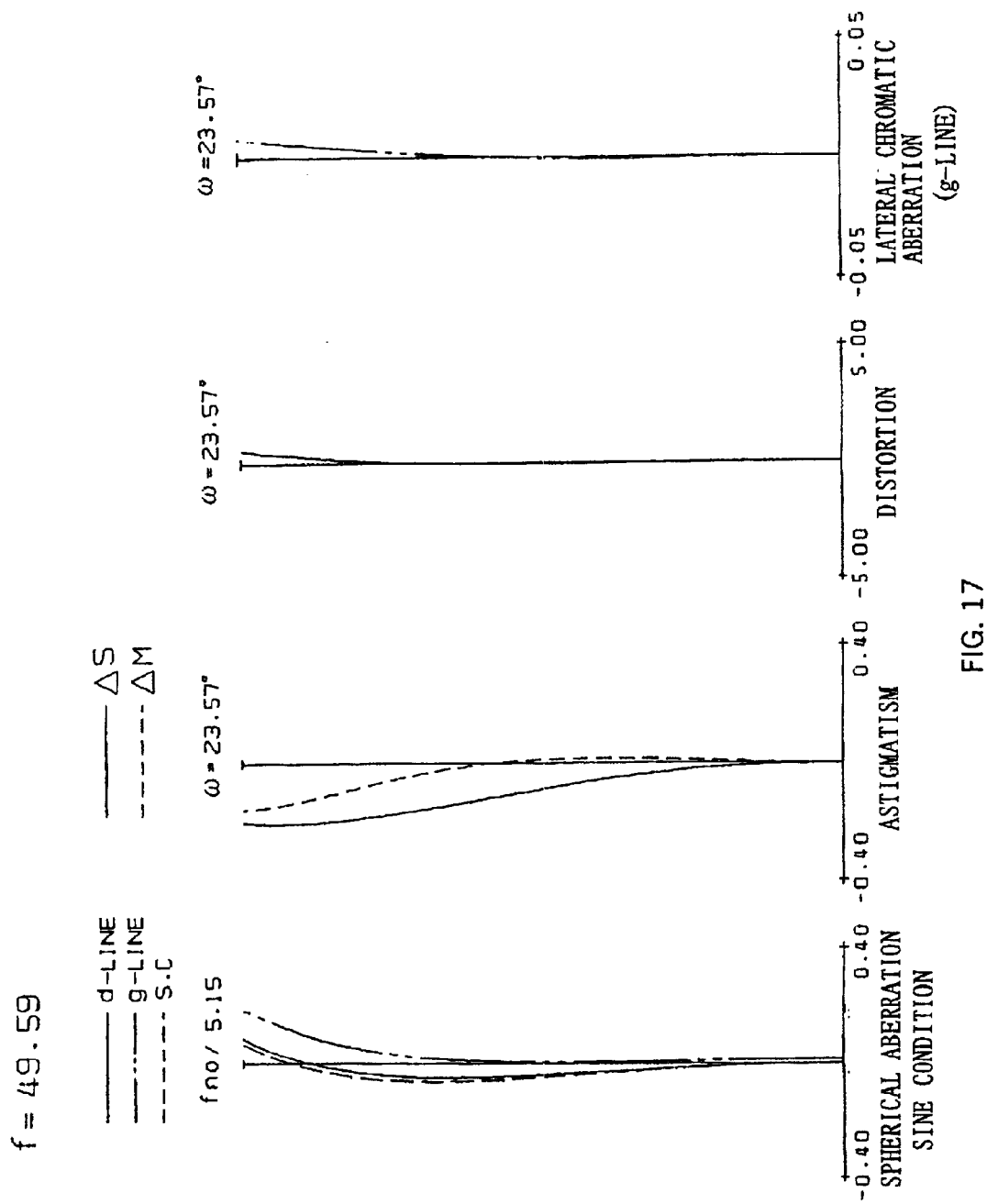
FIG. 17 shows graphic representations of longitudinal aberrations at a middle focal length of a reference state in the zoom lens of the numerical example 3 among the instant embodiments.
Figure 18:
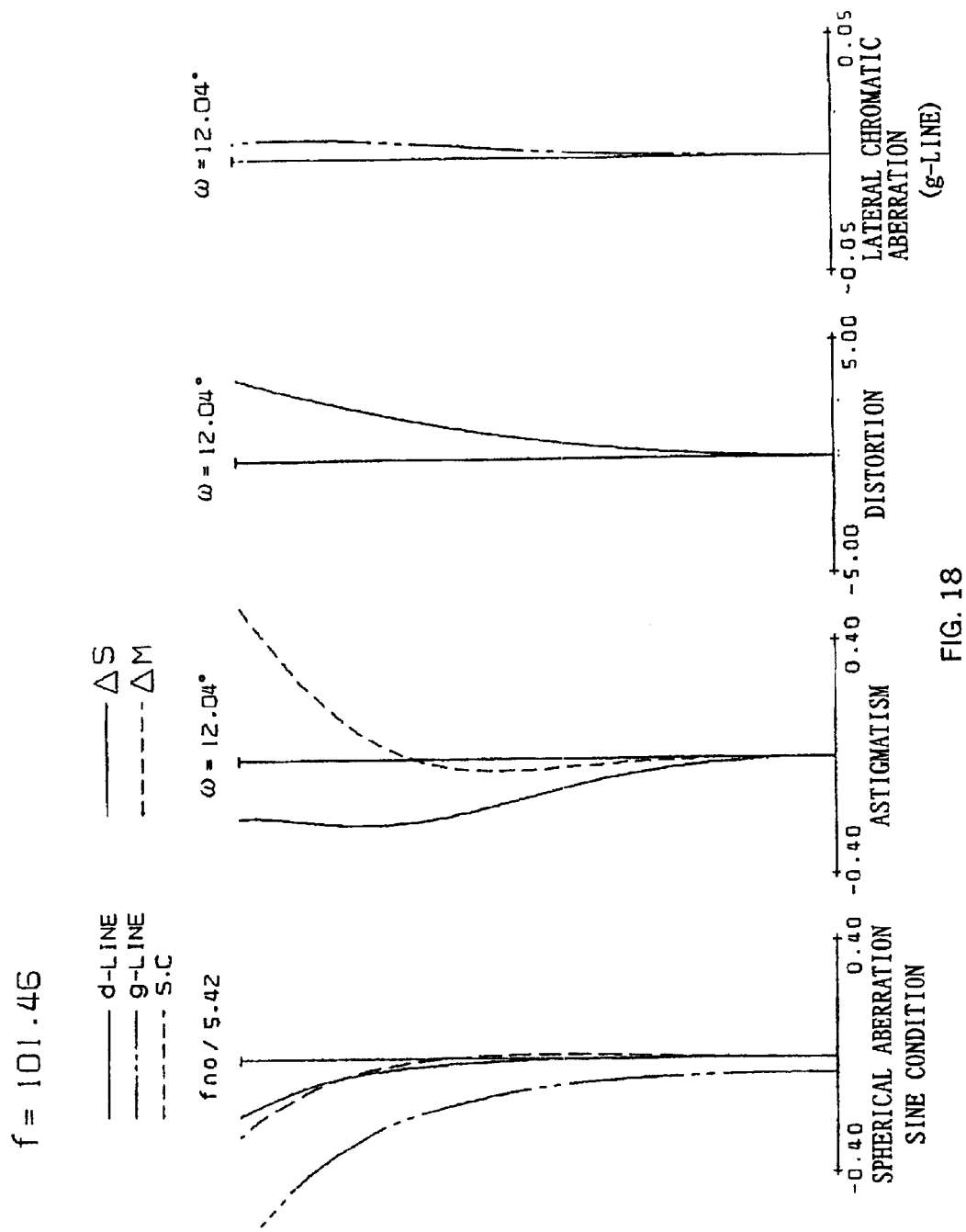
FIG. 18 shows graphic representations of longitudinal aberrations at a telephoto end of a reference state in the zoom lens of the numerical example 3 among the instant embodiments.
Figure 19:
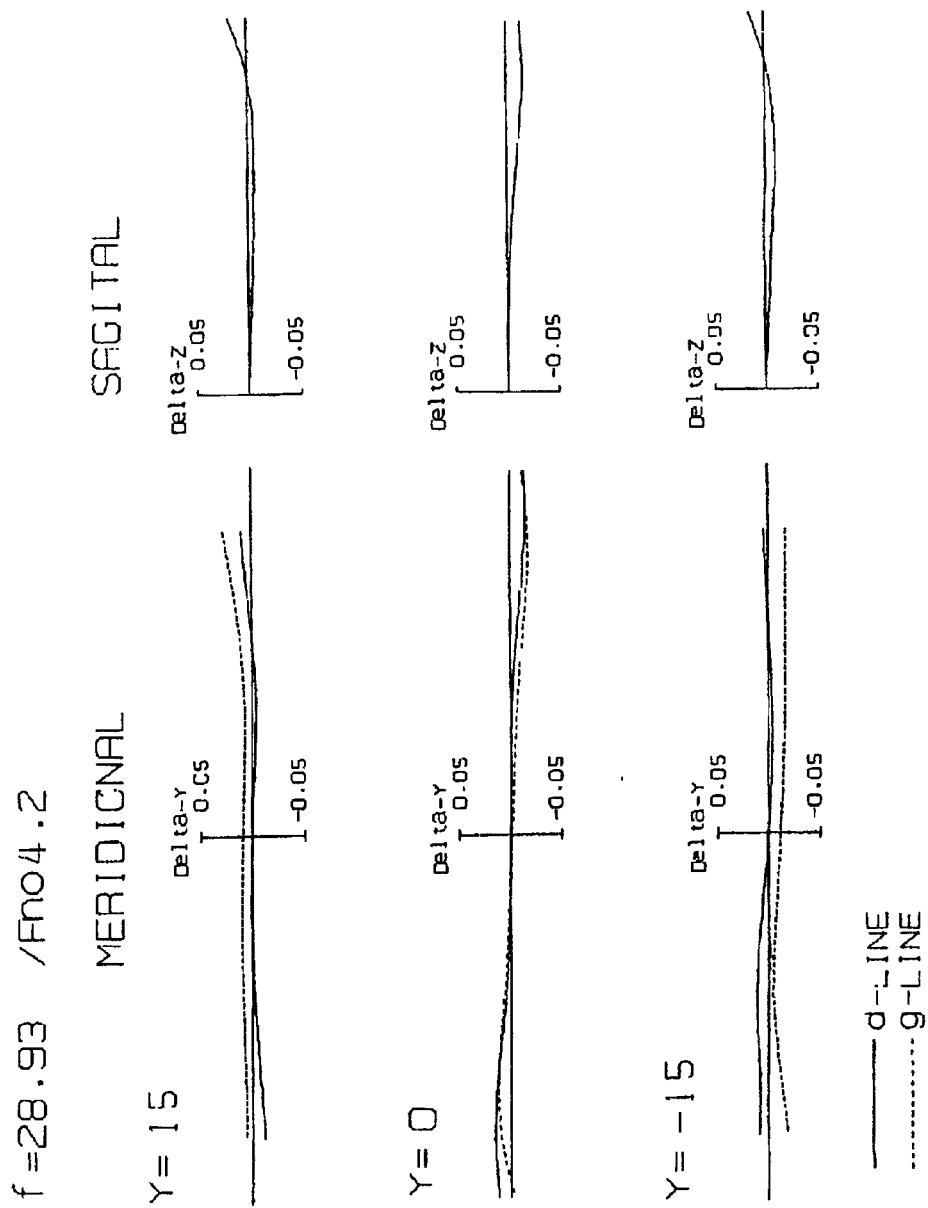
FIG. 19 shows graphic representations of lateral aberrations at a wide-angle end when the zoom lens of the numerical example 3 among the instant embodiments corrects blurred images at an infinite distant object corresponding to an angle of view of 0.3°.
Figure 20:
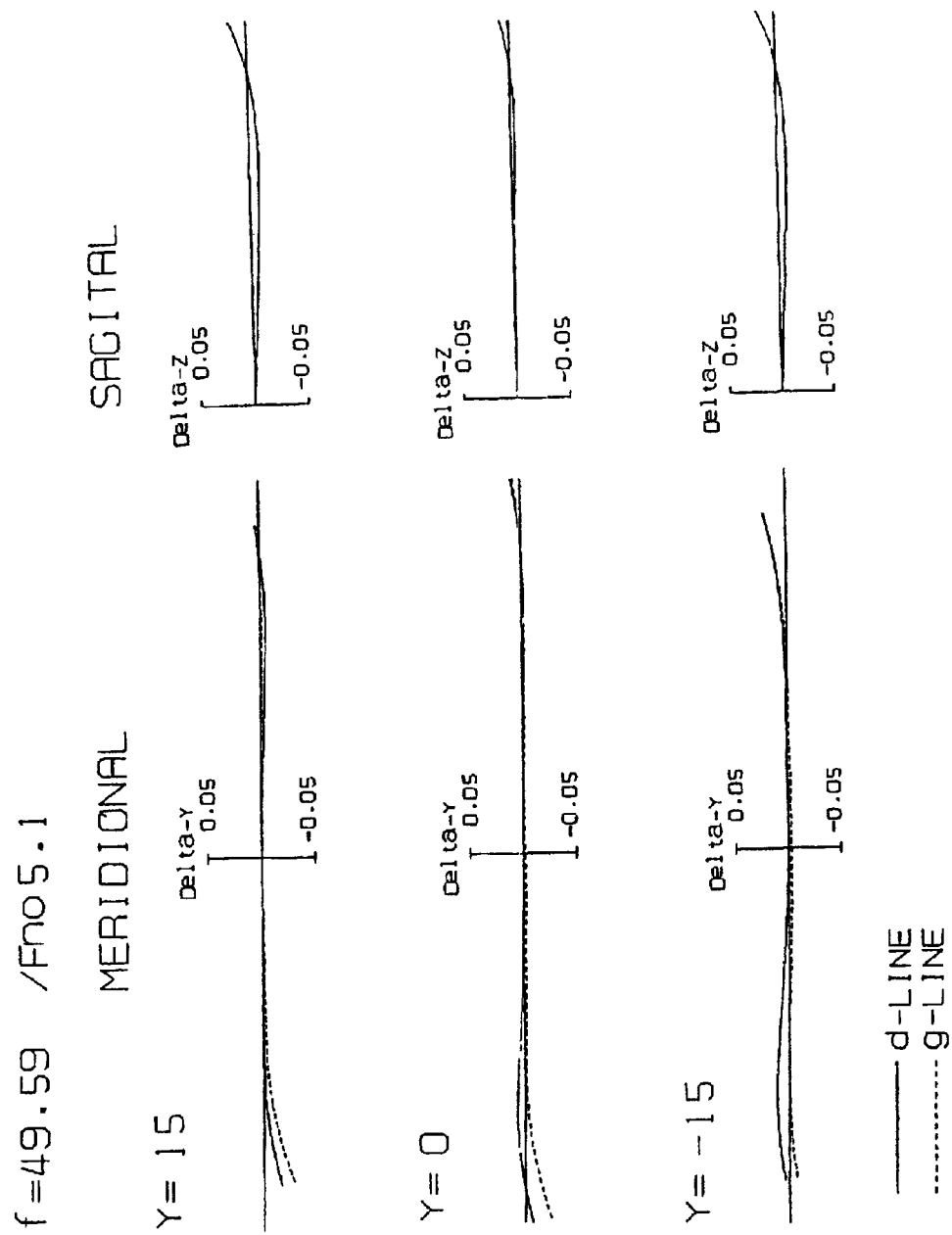
FIG. 20 shows graphic representations of lateral aberrations at a middle focal length when the zoom lens of the numerical example 3 among the instant embodiments corrects blurred images at an infinite distant object corresponding to an angle of view of 0.3°.
Figure 21:
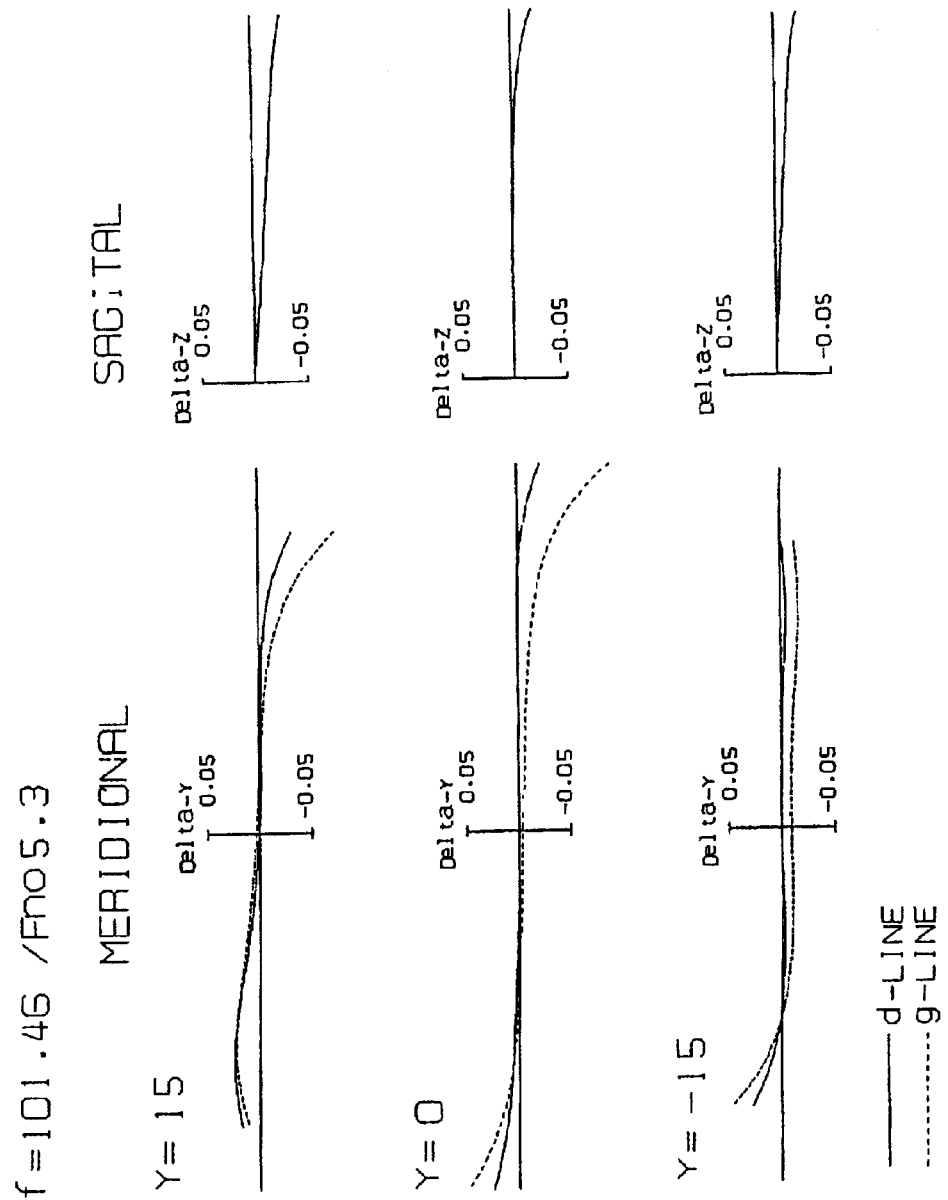
FIG. 21 shows graphic representations of lateral aberrations at a telephoto end when the zoom lens of the numerical example 3 among the instant embodiments corrects blurred images at an infinite distant object corresponding to an angle of view of 0.3°.

FIG. 15 is a sectional view of a zoom lens of numerical example 3 among embodiments of the present invention. FIG. 16 shows graphic representations of longitudinal aberrations at a wide-angle end of a reference state in the zoom lens of the numerical example 3 among the instant embodiments. FIG. 17 shows graphic representations of longitudinal aberrations at a middle focal length of a reference state in the zoom lens of the numerical example 3 among the instant embodiments. FIG. 18 shows graphic representations of longitudinal aberrations at a telephoto end of a reference state in the zoom lens of the numerical example 3 among the instant embodiments. FIG. 19 shows graphic representations of lateral aberrations at a wide-angle end when the zoom lens of the numerical example 3 among the instant embodiments corrects blurred images at an infinite distant object corresponding to an angle of view of 0.3°. FIG. 20 shows graphic representations of lateral aberrations at a middle focal length when the zoom lens of the numerical example 3 among the instant embodiments corrects blurred images at an infinite distant object corresponding to an angle of view of 0.3°. FIG. 21 shows graphic representations of lateral aberrations at a telephoto end when the zoom lens of the numerical example 3 among the instant embodiments corrects blurred images at an infinite distant object corresponding to an angle of view of 0.3°.

Figure 22:
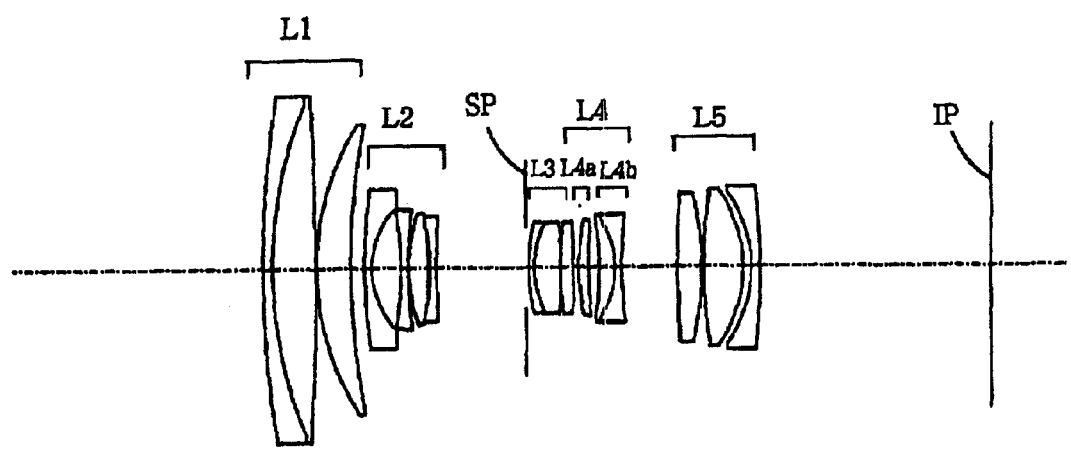
FIG. 22 is a sectional view of a zoom lens of numerical example 4 among embodiments of the present invention.
Figure 23:
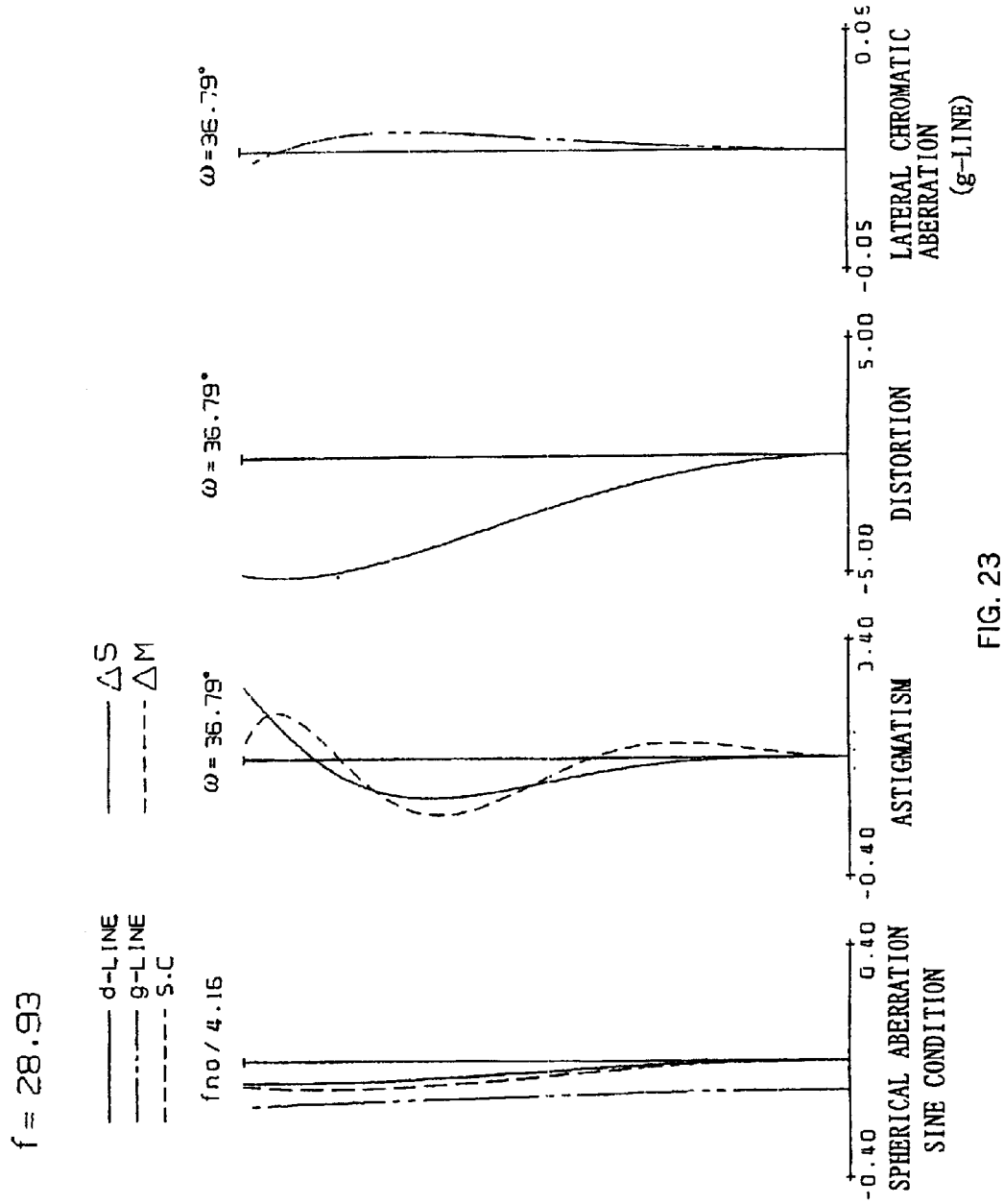
FIG. 23 shows graphic representations of longitudinal aberrations at a wide-angle end of a reference state in the zoom lens of the numerical example 4 among the instant embodiments.
Figure 24:
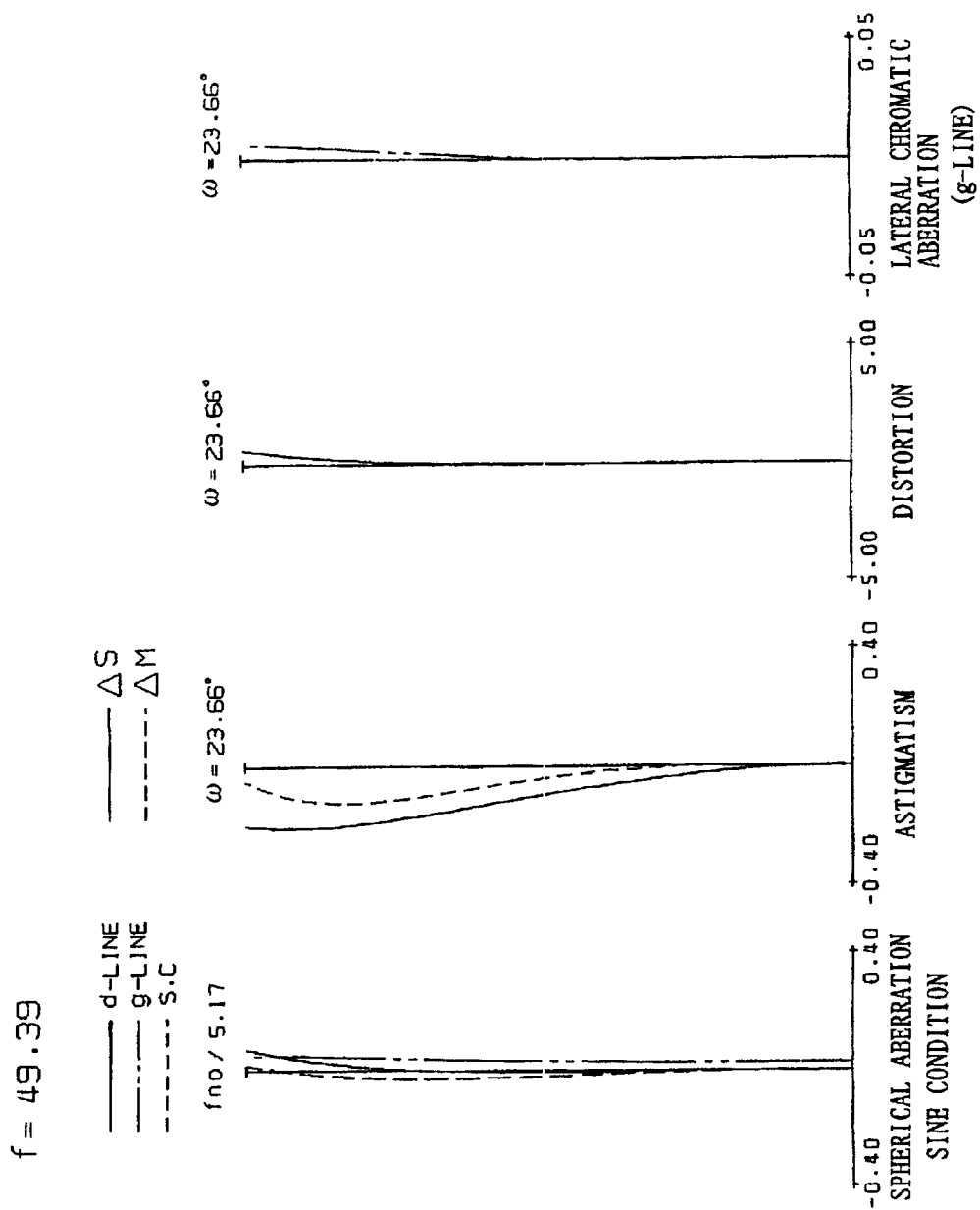
FIG. 24 shows graphic representations of longitudinal aberrations at a middle focal length of a reference state in the zoom lens of the numerical example 4 among the instant embodiments.
Figure 25:
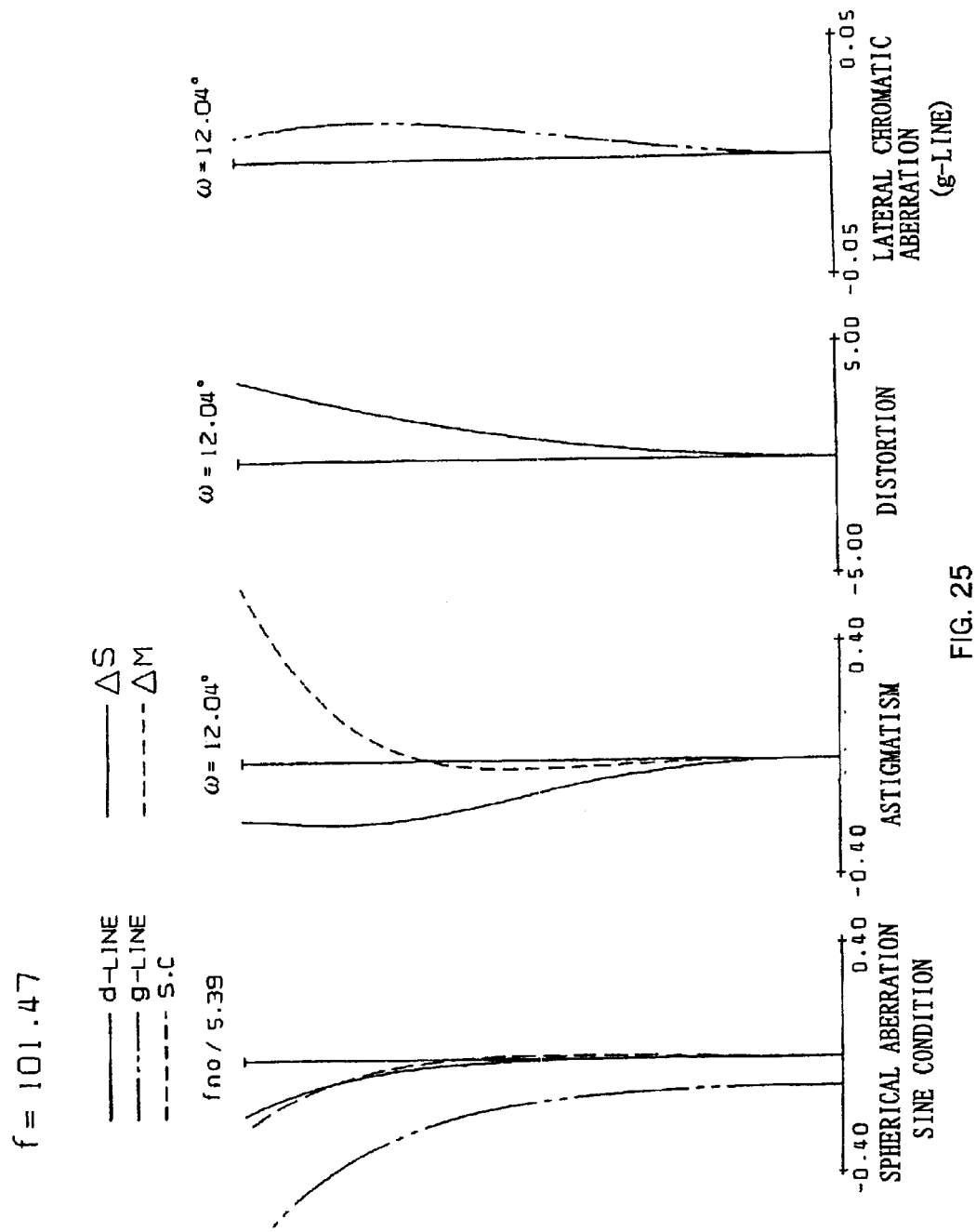
FIG. 25 shows graphic representations of longitudinal aberrations at a telephoto end of a reference state in the zoom lens of the numerical example 4 among the instant embodiments.
Figure 26:
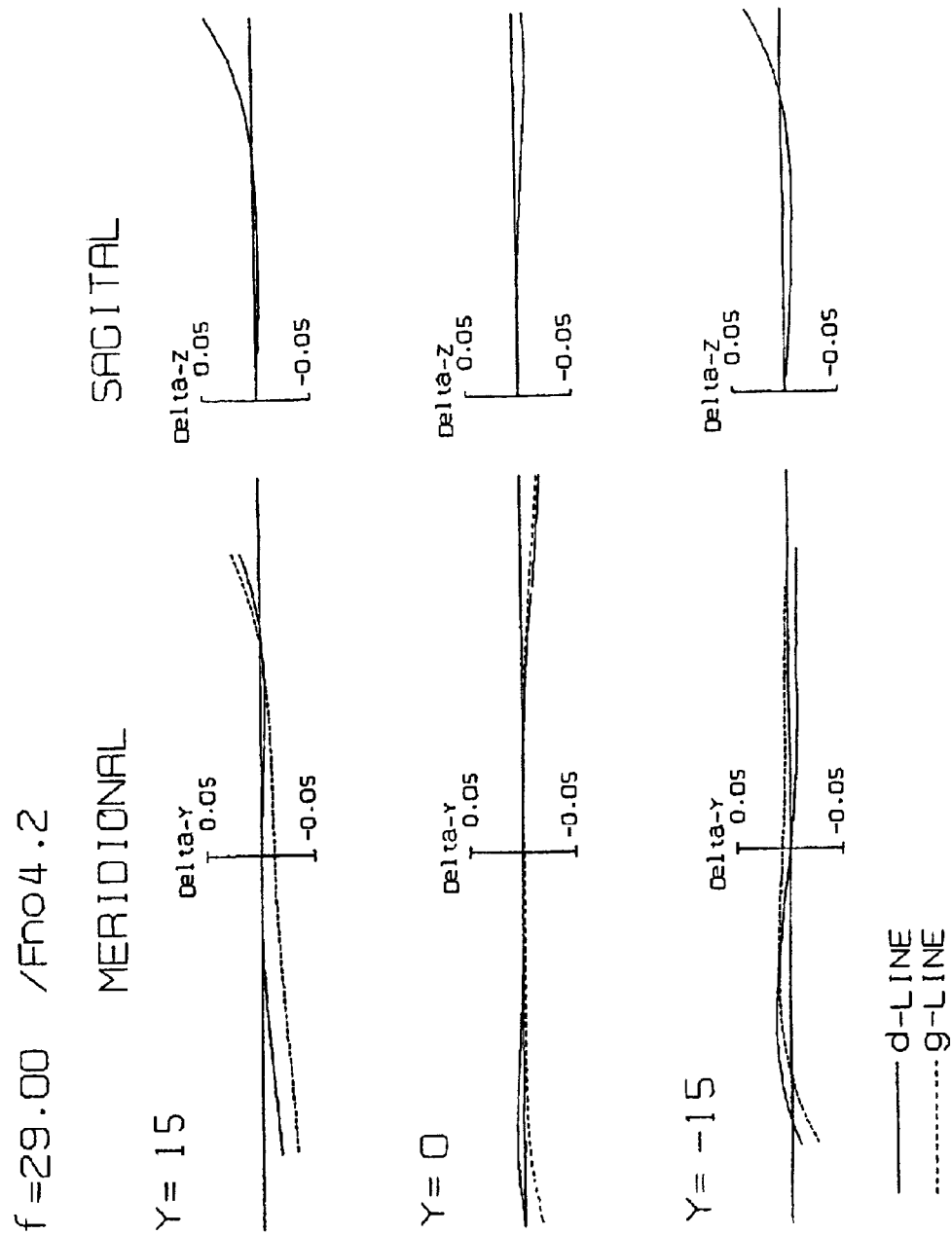
FIG. 26 shows graphic representations of lateral aberrations at a wide-angle end when the zoom lens of the numerical example 4 among the instant embodiments corrects blurred images at an infinite distant object corresponding to an angle of view of 0.3°.
Figure 27:
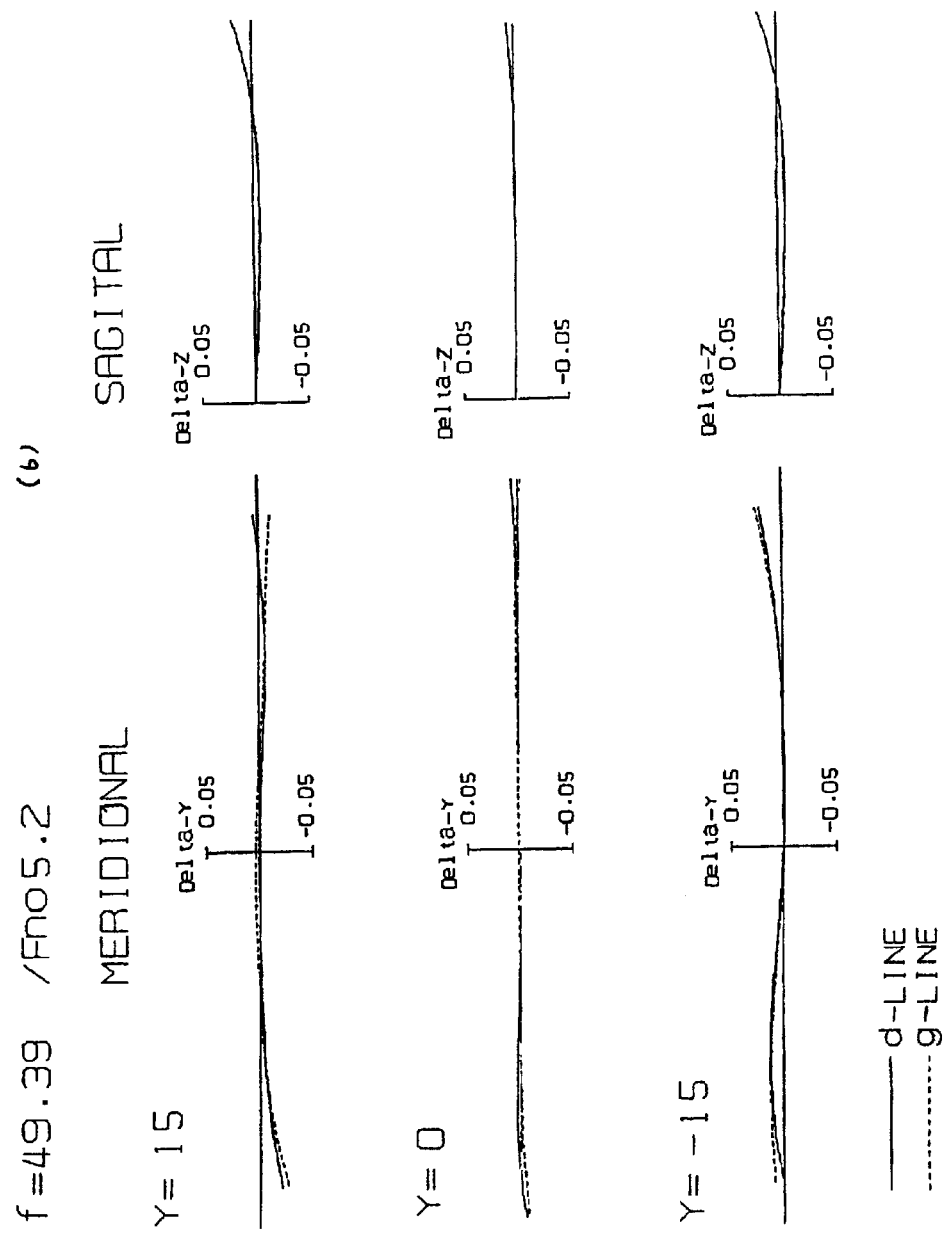
FIG. 27 shows graphic representations of lateral aberrations at a middle focal length when the zoom lens of the numerical example 4 among the instant embodiments corrects blurred images at an infinite distant object corresponding to an angle of view of 0.3°.
Figure 28:
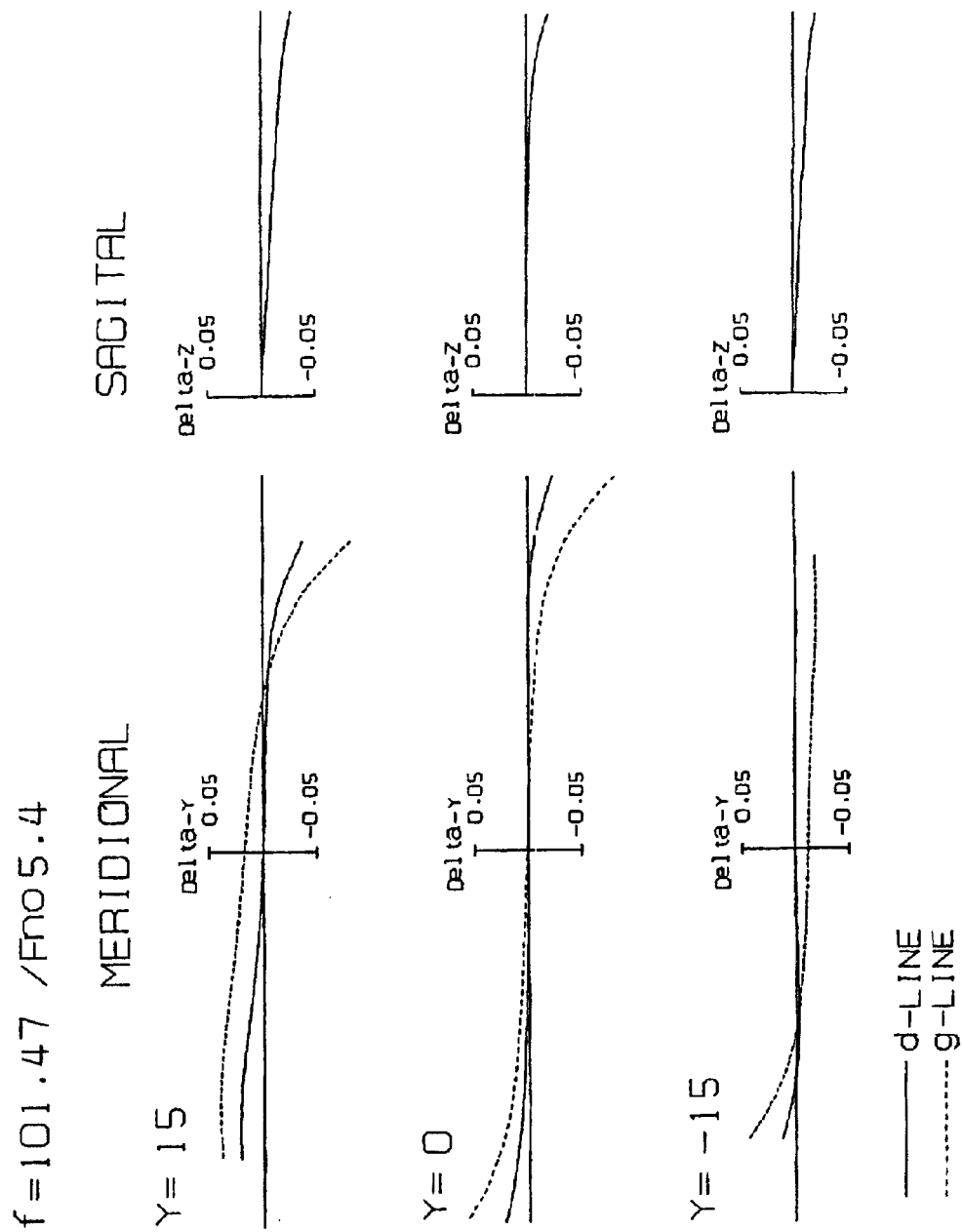
FIG. 28 shows graphic representations of lateral aberrations at a telephoto end when the zoom lens of the numerical example 4 among the instant embodiments corrects blurred images at an infinite distant object corresponding to an angle of view of 0.3°.

FIG. 22 is a sectional view of a zoom lens of numerical example 4 among embodiments of the present invention. FIG. 23 shows graphic representations of longitudinal aberrations at a wide-angle end of a reference state in the zoom lens of the numerical example 4 among the instant embodiments. FIG. 24 shows graphic representations of longitudinal aberrations at a middle focal length of a reference state in the zoom lens of the numerical example 4 among the instant embodiments. FIG. 25 shows graphic representations of longitudinal aberrations at a telephoto end of a reference state in the zoom lens of the numerical example 4 among the instant embodiments. FIG. 26 shows graphic representations of lateral aberrations at a wide-angle end when the zoom lens of the numerical example 4 among the instant embodiments corrects blurred images at an infinite distant object corresponding to an angle of view of 0.3°. FIG. 27 shows graphic representations of lateral aberrations at a middle focal length when the zoom lens of the numerical example 4 among the instant embodiments corrects blurred images at an infinite distant object corresponding to an angle of view of 0.3°. FIG. 28 shows graphic representations of lateral aberrations at a telephoto end when the zoom lens of the numerical example 4 among the instant embodiments corrects blurred images at an infinite distant object corresponding to an angle of view of 0.3°.

In the sectional view of lenses shown in FIG. 1, (W) denotes a wide-angle end, (M) denotes a midpoint, and (T) denotes a telephoto end of a zoom position.

In each numerical example, Y is a height of an image, f is a focal length, $f_{NO}$ is an F number.

In sectional views of lenses shown in FIGS. 1, 8, 15, and 22, L1 is a first unit of positive refractive power (i.e., first lens unit), L2 is a second unit of negative refractive power (i.e., second lens unit), L3 is a third unit of positive refractive power (i.e., third lens unit), L4 is a fourth unit of negative refractive power (i.e., fourth lens unit), L5 is a fifth unit of positive refractive power (i.e., fifth lens unit). SP is a stop and provided at an object side of the third unit. IP is an image plane at which a silver-halide film and a photoelectric conversion element in a CCD, CMOS etc. are located.

The fourth unit L4 denotes a lens component L4$a$ of positive refractive power and a lens component L4$b$ of negative refractive power.

In this embodiment, during zooming from the wide-angle end to the telephoto end, as shown in FIG. 1, each lens unit is moved so that a separation between the first and second units increases, a separation between the second and third units decreases, a separation between the third and fourth units increases, and a separation between the fourth and fifth units decreases. The Stop SP moves integrally with the third unit. The third unit moves integrally with the fifth unit.

Thus, the instant embodiment specifies the refractive power for each lens unit and moves each lens unit during zooming. Thereby, the instant embodiment realizes the high range zooming with effective zoom shares among respective lens units, and properly corrects aberrations throughout the entire zoom range. The normal focus from the infinite distant object to a closest object moves a compact and light second unit L2 to the object side.

Other lens units except the second unit may conduct focusing.

The instant embodiment moves the lens component L4$b$ of negative refractive power as part of the fourth unit in a direction perpendicular to the optical axis, displacing an image, and correcting blurred image caused when the zoom lens vibrates. An image is displaced when the lens component L4$b$ is moved so as to have a component perpendicular to the optical axis, and thus the moving direction is not necessarily limited to the perpendicular direction.

Blurred images can be promptly corrected by using the compact and light lens component L4$b$ of negative refractive power for a vibration resistant member among the fourth unit, and the image quality is properly maintained by keeping small the fluctuations among aberrations in preventing vibrations.

Since the zoom lens of the present invention comprises, in order from the object side, the first, second, third, fourth and fifth having positive, negative, positive, negative, positive refractive powers respectively, the third lens unit constricts the luminous flux incident to the fourth lens unit. Therefore, it is relatively easy to miniaturize the fourth lens unit. In this zoom type, the fourth lens unit assists the zooming range in becoming enough large and serves to properly correct fluctuations among various aberrations during zooming, thus providing relatively small contributions to zooming. Thus, the present invention is characterized in that it is easy to properly control the remaining aberration amount in this lens unit. Due to this characteristic, the fourth lens unit may appropriately correct various eccentric aberrations during defocusing.

From the above two reasons, the present invention assigns the fourth lens unit of negative refractive power to an image displacement correction unit (i.e., vibration-resistant lens unit) in the aforementioned zoom type, rendering the entire apparatus compact and maintaining good stability of optical performance during compensation for vibrations.

While the zoom lens of the present invention may achieve a given object by the above structure, it is preferable to satisfy at least one of following structures to obtain better optical performance.

(a-1) One way is to displace an image and correct a blurred image by including two or more lens components including a lens component of negative refractive power in the fourth lens unit and by moving the lens component of negative refractive power so as to have a component in the direction perpendicular to the optical axis.

In the zoom lens, it is preferable to set the refractive power arrangement for each unit suitable for zooming and aberration corrections, so as to obtain good stability of optical performance. In addition to the above, a refractive power of the image displacement correction unit (i.e., a vibration resistant lens unit) is preferably made suitable for compensation for vibrations in the vibration-compensating zoom lens.

Accordingly, the lens component of negative refractive power is easily and independently set to the refractive power suitable for compensation for vibrations by including in the fourth lens unit two or more lens components including a lens component of negative refractive power, and by assigning the refractive power of the entire fourth lens unit to that suitable for a zoom lens.

(a-2) Another way is to include the lens component of positive refractive power and the lens component of negative refractive power in the fourth lens unit.

When the fourth lens unit of negative refractive power comprises a lens component of positive refractive power and a lens component of negative refractive power, it becomes easy to enhance the refractive power of the lens component of negative refractive power as the image displacement correction unit, to make small the defocus amount during compensation for vibrations, and thus to render compact the entire apparatus.

(a-3) Still another way is to satisfy a condition $0.01 < fis/f4 < 0.8$ —(1) where fis is a focal length of the lens component of negative refractive power that is moved so as to have the component of the direction perpendicular to the optical axis, and f4 is a focal length of the fourth lens unit.

This equation (1) is a condition to properly set up a ratio of the focal length of the lens component of negative refractive power that is moved so as to have a component of the direction perpendicular to the optical axis, to that of the fourth lens unit. When it exceeds the upper limit, the defocus amount becomes too large during compensation for vibrations, and when it exceeds the lower limit, it becomes difficult to correct various aberrations, in particular the coma aberration at a telephoto end during compensation for vibrations.

More preferably, the equation (1) is set into the following numerical range:

$$0.15 < fis/f4 < 0.45 \tag{1a}$$

(a-4) Another way is to include, in order from the object side, a lens component of positive refractive power and a lens component of negative refractive power in the fourth lens unit, and to displace an image by moving the lens component of negative refractive power in the direction approximately perpendicular to the optical axis, correcting image blurs.

By including, in order from the object side, a lens component of positive refractive power and a lens component of negative refractive power in the fourth lens unit, and displacing an image position by moving the lens component of negative refractive power in the direction approximately perpendicular to the optical axis, correcting blurs in image, the luminous-flux constricting power by the lens component of positive refractive power makes small a diameter of the luminous flux incident to the lens unit of negative refractive power, consequently enabling to make small the image displacement correction unit.

(a-5) Another way is to satisfy a condition $-0.8 < \beta rt < -0.1$ —(2) where $\beta rt$ is a lateral magnification at a telephoto end of an optical member disposed closer to the image plane side than the lens component of negative refractive power that is to be moved so as to have the component in the direction approximately perpendicular to the axial.

The image displacement sensitivity of the image displacement correction unit (i.e., vibration resistant lens unit) is represented by the following equation:

$$ES = (1-\beta is) \times Br \tag{3}$$

where ES is the image displacement sensitivity (i.e., image displacement amount per unit displacement amount of the image displacement correction unit), $\beta is$ is a magnification of the image displacement correction unit, Br is a magnification of an optical system disposed between the image displacement correction unit and the image plane.

According to the equation (3), it may be said that the magnification of the optical system disposed between the image displacement correction unit and the image plane is proportional to the image displacement sensitivity.

It is a condition set by taking the equation (2) into account, and when it exceeds the upper limit, an absolute value of the image displacement sensitivity in the image displacement correction unit tends to be small, and consequently the entire apparatus tends to be large since the defocus amount increases during compensation for vibrations. On the contrary, when it exceeds the lower limit, the absolute value of the image displacement sensitivity tends to be large, but the displacement of the image displacement correction unit requires high precise control mechanism and disadvantageously making the entire apparatus larger.

It is preferable to set the equation (2) into the following numerical range:

$$-0.5 < \beta rt < -0.2 \tag{2a}$$

As discussed, according to the instant embodiment, the zoom range becomes high at the wide-angle end such that the angle of view becomes about 74° that is four times large, while the good stability of optical performance is maintained throughout the zoom range. In addition, even when it is equipped with a (vibration resistant) mechanism for compensating vibrations, the entire apparatus may become small and the zoom lens may provide a good image during compensation for vibrations.

Figure 29:
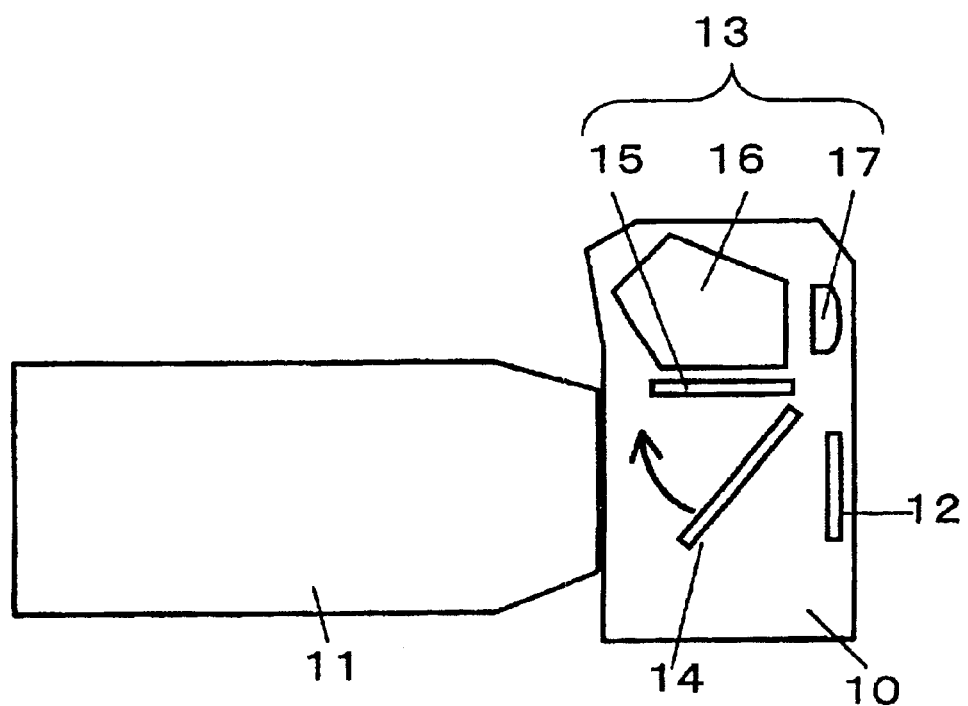
FIG. 29 is a schematic diagram of an essential part of the optical apparatus using the zoom lens of the present invention.

Next follows a description of a single-lens reflex camera using a zoom lens having a vibration resistant function of an embodiment according to the present invention, with reference to FIG. 29.

In FIG. 29, 10 denotes a camera body, 11 denotes a zoom lens of the present invention, and 12 denotes photographing means, which includes a film, CCD as a photoelectric conversion element, etc. 13 denotes a finder system including a focus plate 15 on which a subject image is formed, a pentaprism 16 as an image inversing means, and an eyepiece 17 for observing the subject image on the focus plate 15. 14 denotes a quick return mirror.

Thus, an application of the inventive zoom lens to an optical apparatus such as a single-lens reflex camera would render small the optical apparatus and enhance the optical performance.

Next follows numerical examples of the present invention. In these numerical examples, "i" denotes an order of an optical surface from the object side, and Ri represents a radius of curvature of the i-th optical surface (i-th surface). Di is a separation between the i-th and i+1-th surfaces, Ni and vi are the refractive power and abbe number of the material of the i-th optical member for d-line.

Table 1 shows a relationship between the above equations and various numerical values in the numerical examples.

The aspheric shape is expressed by the following equation:

$$X = \frac{(1/R)H^2}{1+\sqrt{1-(H/R)^2}} + AH^2 + BH^4 + CH^6 + DH^8 + EH^{10}$$

where R is the radius of curvature at the center part of the lens surface, X is a displacement in the optical axis direction, H, A, B, C, D, E are aspheric coefficients, and "e-a" means "$\times 10^{-a}$".

Numerical Example 1

| f = 29.01~101.44 | Fno = 4.16~5.26 | 2ω = 73.5~24.1 | |
|---|---|---|---|
| R1 = 108.591 | D1 = 1.50 | N1 = 1.846660 | ν1 = 23.8 |
| R2 = 54.430 | D2 = 7.79 | N2 = 1.622992 | ν2 = 58.2 |
| R3 = 1851.906 | D3 = 0.20 | | |
| R4 = 41.822 | D4 = 6.07 | N3 = 1.712995 | ν3 = 53.9 |
| R5 = 115.785 | D5 = Variable | | |
| R6 = 92.731 | D6 = 1.20 | N4 = 1.834000 | ν4 = 37.2 |
| R7 = 12.487 | D7 = 4.75 | | |
| R8 = −35.612 | D8 = 1.10 | N5 = 1.804000 | ν5 = 46.6 |
| R9 = 33.983 | D9 = 0.20 | | |
| R10 = 24.005 | D10 = 4.55 | N6 = 1.846660 | ν6 = 23.8 |
| R11 = −41.539 | D11 = 0.50 | | |
| R12 = −24.641 | D12 = 1.00 | N7 = 1.772499 | ν7 = 49.6 |
| R13 = −67.354 | D13 = Variable | | |
| R14 = Stop | D14 = 0.39 | | |
| R15 = 27.872 | D15 = 1.00 | N8 = 1.846660 | ν8 = 23.8 |
| R16 = 14.768 | D16 = 5.30 | N9 = 1.603112 | ν9 = 60.6 |
| R17 = −35.206 | D17 = Variable | | |
| R18 = 22.069 | D18 = 3.27 | N10 = 1.517417 | ν10 = 52.4 |
| R19 = −24.545 | D19 = 1.00 | N11 = 1.834807 | ν11 = 42.7 |
| R20 = 4016.395 | D20 = 1.80 | | |
| R21 = −62.727 | D21 = 2.82 | N12 = 1.846660 | ν12 = 23.8 |
| R22 = −14.382 | D22 = 1.00 | N13 = 1.723420 | ν13 = 38.0 |
| R23 = 44.669 | D23 = Variable | | |
| R24 = −6743.672 | D24 = 3.83 | N14 = 1.583126 | ν14 = 59.4 |
| *R25 = −26.332 | D25 = 0.15 | | |
| R26 = 60.361 | D26 = 5.25 | N15 = 1.517417 | ν15 = 52.4 |
| R27 = −25.811 | D27 = 1.72 | | |
| R28 = −19.913 | D28 = 1.40 | N16 = 1.805181 | ν16 = 25.4 |
| R29 = −134.908 | | | |

| Variable | Focal Length | | |
|---|---|---|---|
| Separation | 29.00 | 48.73 | 101.44 |
| D5 | 2.28 | 12.25 | 28.44 |
| D13 | 13.91 | 7.96 | 1.34 |
| D17 | 0.80 | 4.16 | 6.49 |
| D23 | 9.13 | 5.77 | 3.43 |

Aspheric Coefficients

25th Surface: A = 0.00000e+00  B = 1.45326e−06  C = −1.66852e−08  D = 2.67704e−10  E = −1.39088e−12

Numerical Example 2

| f = 29.01~101.49 | Fno = 4.16~5.26 | 2ω = 73.4~24.1 | |
|---|---|---|---|
| R1 = 110.043 | D1 = 1.50 | N1 = 1.846660 | ν1 = 23.8 |
| R2 = 54.731 | D2 = 7.80 | N2 = 1.622992 | ν2 = 58.2 |
| R3 = 1810.046 | D3 = 0.20 | | |
| R4 = 39.913 | D4 = 6.02 | N3 = 1.712995 | ν3 = 53.9 |
| R5 = 110.448 | D5 = Variable | | |
| R6 = 86.720 | D6 = 1.20 | N4 = 1.834000 | ν4 = 37.2 |
| R7 = 12.155 | D7 = 4.61 | | |
| R8 = −36.200 | D8 = 1.10 | N5 = 1.804000 | ν5 = 46.6 |
| R9 = 34.257 | D9 = 0.24 | | |
| R10 = 23.588 | D10 = 4.67 | N6 = 1.846660 | ν6 = 23.8 |
| R11 = −42.164 | D11 = 0.50 | | |
| R12 = −24.466 | D12 = 1.00 | N7 = 1.772499 | ν7 = 49.6 |
| R13 = −74.405 | D13 = Variable | | |
| R14 = Stop | D14 = 0.39 | | |
| R15 = 27.660 | D15 = 1.00 | N8 = 1.846660 | ν8 = 23.8 |
| R16 = 14.694 | D16 = 3.45 | N9 = 1.603112 | ν9 = 60.6 |
| R17 = −37.267 | D17 = Variable | | |
| R18 = 22.808 | D18 = 3.13 | N10 = 1.517417 | ν10 = 52.4 |
| R19 = −24.447 | D19 = 1.00 | N11 = 1.834807 | ν11 = 42.7 |
| R20 = −1020.201 | D20 = 1.81 | | |
| R21 = −58.858 | D21 = 2.62 | N12 = 1.846660 | ν12 = 23.8 |
| R22 = −14.414 | D22 = 1.00 | N13 = 1.723420 | ν13 = 38.0 |
| R23 = 49.840 | D23 = Variable | | |
| R24 = 1498.357 | D24 = 3.72 | N14 = 1.583126 | ν14 = 59.4 |
| *R25 = −27.410 | D25 = 0.16 | | |
| R26 = 57.947 | D26 = 5.67 | N15 = 1.517417 | ν15 = 52.4 |
| R27 = −23.520 | D27 = 1.73 | | |
| R28 = −19.690 | D28 = 1.40 | N16 = 1.805181 | ν16 = 25.4 |
| R29 = −142.394 | | | |

| Variable | Focal Length | | |
|---|---|---|---|
| Separation | 29.01 | 48.50 | 101.49 |
| D5 | 2.22 | 11.42 | 27.42 |
| D13 | 13.30 | 7.55 | 1.07 |
| D17 | 2.42 | 5.69 | 7.58 |
| D23 | 8.38 | 5.11 | 3.22 |

Aspheric Coefficients

25th Surface: A = 0.00000e+00  B = 4.07453e−06  C = −3.51279e−09  D = 2.17623e−10  E = −1.03456e−12

Numerical Example 3

| f = 28.93~101.46 | Fno = 4.16~5.42 | 2ω = 73.6~24.1 | |
|---|---|---|---|
| R1 = 149.986 | D1 = 1.50 | N1 = 1.846660 | ν1 = 23.8 |
| R2 = 62.807 | D2 = 6.75 | N2 = 1.622992 | ν2 = 58.2 |
| R3 = −687.901 | D3 = 0.20 | | |
| R4 = 40.254 | D4 = 5.38 | N3 = 1.712995 | ν3 = 53.9 |
| R5 = 113.210 | D5 = Variable | | |
| R6 = 120.661 | D6 = 1.20 | N4 = 1.834000 | ν4 = 37.2 |
| R7 = 13.182 | D7 = 4.93 | | |
| R8 = −60.749 | D8 = 1.10 | N5 = 1.804000 | ν5 = 46.6 |
| R9 = 48.307 | D9 = 0.16 | | |
| R10 = 23.298 | D10 = 3.35 | N6 = 1.846660 | ν6 = 23.8 |
| R11 = −63.551 | D11 = 1.03 | | |
| R12 = −37.174 | D12 = 1.00 | N7 = 1.772499 | ν7 = 49.6 |
| R13 = 136.041 | D13 = Variable | | |
| R14 = Stop | D14 = 0.39 | | |
| R15 = 26.220 | D15 = 1.00 | N8 = 1.846660 | ν8 = 23.8 |
| R16 = 13.480 | D16 = 4.09 | N9 = 1.603112 | ν9 = 60.6 |
| R17 = −49.033 | D17 = Variable | | |
| R18 = 26.427 | D18 = 2.80 | N10 = 1.749497 | ν10 = 35.3 |
| R19 = 50.820 | D19 = 2.34 | | |
| R20 = −45.974 | D20 = 2.47 | N11 = 1.805181 | ν11 = 25.4 |
| R21 = −13.593 | D21 = 1.00 | N12 = 1.720000 | ν12 = 42.0 |
| R22 = 80.110 | D22 = Variable | | |
| R23 = 138.377 | D23 = 4.00 | N13 = 1.583126 | ν13 = 59.4 |
| *R24 = −31.298 | D24 = 0.15 | | |
| R25 = 79.528 | D25 = 6.59 | N14 = 1.518229 | ν14 = 58.9 |
| R26 = −19.312 | D26 = 0.97 | | |
| R27 = −18.204 | D27 = 1.40 | N15 = 1.805181 | ν15 = 25.4 |
| R28 = −132.609 | | | |

| Variable | Focal Length | | |
|---|---|---|---|
| Separation | 28.93 | 49.59 | 101.46 |
| D5 | 2.43 | 9.76 | 27.02 |
| D13 | 15.10 | 7.50 | 0.86 |
| D17 | 0.92 | 4.41 | 6.42 |
| D22 | 9.23 | 5.74 | 3.73 |

-continued

Aspheric Coefficients

| 24th Surface: | A = 0.00000e+00 | B = 7.03758e−06 | C = 6.37933e−09 |
|---|---|---|---|
| | D = 7.45372e−11 | E = 3.19869e−13 | |

Numerical Example 4 f = 28.93~101.47   Fno = 4.16~5.39   2ω = 73.6~24.1

| R1 = 158.101 | D1 = 1.50 | N1 = 1.846660 | ν1 = 23.8 |
|---|---|---|---|
| R2 = 64.957 | D2 = 6.85 | N2 = 1.622992 | ν2 = 58.2 |
| R3 = −475.558 | D3 = 0.20 | | |
| R4 = 39.273 | D4 = 5.36 | N3 = 1.712995 | ν3 = 53.9 |
| R5 = 103.251 | D5 = Variable | | |
| R6 = 82.467 | D6 = 1.20 | N4 = 1.834000 | ν4 = 37.2 |
| R7 = 13.021 | D7 = 4.71 | | |
| R8 = −49.608 | D8 = 1.10 | N5 = 1.804000 | ν5 = 46.6 |
| R9 = 48.465 | D9 = 0.19 | | |
| R10 = 23.685 | D10 = 3.23 | N6 = 1.846660 | ν6 = 23.8 |
| R11 = −51.132 | D11 = 0.46 | | |
| R12 = −29.985 | D12 = 1.00 | N7 = 1.772499 | ν7 = 49.6 |
| R13 = 169.279 | D13 = Variable | | |
| R14 = Stop | D14 = 0.39 | | |
| R15 = 27.398 | D15 = 1.00 | N8 = 1.846660 | ν8 = 23.8 |
| R16 = 14.452 | D16 = 4.17 | N9 = 1.603112 | ν9 = 60.6 |
| R17 = −205.716 | D17 = 0.15 | | |
| R18 = 49.888 | D18 = 2.00 | N10 = 1.603112 | ν10 = 60.6 |
| R19 = −472.421 | D19 = Variable | | |
| R20 = 30.321 | D20 = 1.66 | N11 = 1.749497 | ν11 = 35.3 |
| R21 = 71.212 | D21 = 1.81 | | |
| R22 = −54.125 | D22 = 2.57 | N12 = 1.805181 | ν12 = 25.4 |
| R23 = −13.933 | D23 = 1.00 | N13 = 1.723420 | ν13 = 38.0 |
| R24 = 57.841 | D24 = Variable | | |
| R25 = 182.745 | D25 = 4.00 | N14 = 1.583126 | ν14 = 59.4 |
| *R26 = −37.682 | D26 = 0.15 | | |
| R27 = 74.586 | D27 = 6.45 | N15 = 1.518229 | ν15 = 58.9 |
| R28 = −19.824 | D28 = 1.26 | | |
| R29 = −18.922 | D29 = 1.40 | N16 = 1.805181 | ν16 = 25.4 |
| R30 = −107.252 | | | |

| Variable | Focal Length | | |
|---|---|---|---|
| Separation | 28.93 | 49.39 | 101.47 |
| D5 | 2.33 | 9.44 | 26.94 |
| D13 | 14.86 | 7.81 | 1.61 |
| D19 | 0.81 | 5.22 | 7.85 |
| D24 | 9.00 | 4.59 | 1.96 |

Aspheric Coefficients

| 26th Surface: | A = 0.00000e+00 | B = 1.10031e−05 | C = 1.14575e−08 |
|---|---|---|---|
| | D = 2.70859e−10 | E = −7.37022e−13 | |

TABLE 1

| Equations | Numerical Example 1 | Numerical Example 2 | Numerical Example 3 | Numerical Example 4 |
|---|---|---|---|---|
| fis/f4 | 0.398 | 0.378 | 0.214 | 0.274 |
| βrt | −0.265 | −0.357 | −0.273 | −0.370 |

Illustrated in Table 2 are examples of focal lengths of the various lenses as discussed above with respect to Table 1.

TABLE 2

| | Numerical Examples | | | |
|---|---|---|---|---|
| | 1 | 2 | 3 | 4 |
| f1 | 69.24 | 67.13 | 68.24 | 67.67 |
| f2 | −14.51 | −14.12 | −15.16 | −14.70 |
| f3 | 33.11 | 33.64 | 38.21 | 33.70 |
| f4 | −117.69 | −128.90 | −229.99 | −167.74 |
| f5 | 48.62 | 45.81 | 47.19 | 50.93 |
| fis | −46.89 | −48.73 | −49.12 | −46.04 |

Thus, the instant embodiment may provide a zoom lens and optical apparatus using the same which have a high range zoom and maintains the good stability of optical performance throughout the zoom range, facilitating a compact size of the entire apparatus even when including a (vibration resistant) mechanism for compensating vibrations, and may provide good images during compensation of vibrations.

What is claimed is:

1. A zoom lens comprising, in order from an object side,
a first lens unit of positive refractive power;
a second lens unit of negative refractive power;
a third lens unit of positive refractive power;
a fourth lens unit of negative refractive power, wherein said fourth lens unit comprises two or more lens components including a lens component of negative refractive power; and
a fifth lens unit of positive refractive power,
wherein predetermined lens units move during zooming from a wide-angle end to a telephoto end so that a separation between said first and second lens units increases, a separation between said second and third lens unit decreases, a separation between said third and fourth lens units increases, and a separation between said fourth and fifth lens unit decreases, and
wherein an image is displaced by moving the lens component of negative refractive power in said fourth lens unit so as to have a component of a direction perpendicular to an optical axis of said zoom lens, and
wherein a condition $0.01 < fis/f4 < 0.8$ is satisfied where fis is a focal length of said lens component of negative refractive power so as to have the component of the direction perpendicular to the optical axis, and f4 is a focal length of the fourth lens unit.

2. A zoom lens according to claim 1, wherein said zoom lens forms an image on a photoelectric conversion element.

3. A zoom lens according to claim 1, wherein said fourth lens unit includes a lens component of positive refractive power and said lens component of negative refractive power.

4. A zoom lens according to claim 3, wherein the lens component of positive refractive power comprises a cemented lens of a positive lens and a negative lens or a single positive lens, and the lens component of negative refractive power comprises a cemented lens of a positive lens and a negative lens.

5. A zoom lens according to claim 1, wherein the fourth lens unit includes, in order from the object side, a lens component of positive refractive power, and said lens component of negative refractive power that displaces an image by moving said lens component of negative refractive power so as to have the component of the direction perpendicular to the optical axis.

6. A zoom lens according to claim 1, wherein a condition $-0.8 < βrt < -0.1$ is satisfied where rt is a lateral magnification at a telephoto end of optical part disposed closer to an image plane than said lens component of negative refractive power that is moved so as to have the component of the direction perpendicular to the optical axis of said zoom lens.

7. A zoom lens comprising in order from an object side, a first lens unit of positive refractive power;

a second lens unit of negative refractive power;

a third lens unit of positive refractive power;

a fourth lens unit of negative refractive power; and a fifth lens unit of positive refractive power, wherein predetermined lens units move during zooming from wide-angle end to a telephoto end so that a separation between said first and second lens units increases, a separation between said second and third lens units decreases, a separation between said third and fourth lens units increases, and a separation between said fourth and fifth lens units decreases, wherein an image is displaced by moving at least part of the fourth lens unit so as to have a component of a direction perpendicular to an optical axis of said zoom lens, and wherein said zoom lens satisfies the following condition:

$$-0.5 < \beta rt < -0.2$$

where $\beta rt$ is a lateral magnification at a telephoto end of optical part disposed closer to an image plane than said at least part of the fourth lens unit so as to have a component of a direction perpendicular to the optical axis of said zoom lens.

8. A zoom lens comprising, in order from an object side:

a first lens unit of positive refractive power;

a second lens unit of negative refractive power;

a third lens unit of positive refractive power;

a fourth lens unit of negative refractive power, where said fourth lens unit comprises two or more lens components including a lens component of negative refractive power, and a fifth lens unit of positive refractive power, wherein predetermined lens units move during zooming from a wide angle end to a telephoto end so that a separation between said first and second lens units increases, a separation between said second and third lens units decreases, a separation between said third and fourth lens units increases, and a separation between said fourth and fifth lens units decreases, wherein an image is displaced by moving the lens component of negative refractive power in said fourth lens unit so as to have a component of a direction perpendicular to an optical axis of said zoom lens, and wherein a condition $-0.8 < \beta rt < -0.1$ is satisfied where $\beta rt$ is a lateral magnification at a telephoto end of optical part disposed closer to an image plane than said lens component of negative refractive power that is moved so as to have the component of the direction perpendicular to the optical axis of said zoom lens.

* * * * *